United States Patent

Murai et al.

[11] Patent Number: 5,978,107
[45] Date of Patent: *Nov. 2, 1999

[54] METHOD AND APPARATUS FOR DETERMINING COLOR TRANSFORMATION COEFFICIENTS

[75] Inventors: Kazumasa Murai; Shinji Kita; Hitoshi Ogatsu, all of Kanagawa, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/510,539

[22] Filed: Aug. 2, 1995

[30] Foreign Application Priority Data

Aug. 3, 1994 [JP] Japan .................................. 6-182368
Jul. 17, 1995 [JP] Japan .................................. 7-180455

[51] Int. Cl.⁶ ...................................................... G03F 3/08
[52] U.S. Cl. .......................................... 358/520; 358/518
[58] Field of Search .................................. 358/518–523, 358/500, 504; 348/650

[56] References Cited

U.S. PATENT DOCUMENTS 4,670,780  6/1987  McManus et al. ......................... 358/80
4,941,038  7/1990  Walowit .................................... 358/80
5,162,899  11/1992  Naka et al. ............................. 358/80
5,376,962  12/1994  Zortea .................................... 348/222
5,483,360  1/1996  Rolleston ............................... 358/518
5,546,195  8/1996  Arai ....................................... 358/518

FOREIGN PATENT DOCUMENTS 4-83471    3/1992  Japan .
4-142877   5/1992  Japan .
5-233787   9/1993  Japan .
6-274662   9/1994  Japan .

*Primary Examiner*—Thomas D. Lee
*Assistant Examiner*—Stephen Brinich
*Attorney, Agent, or Firm*—Finnegan, Henderson, Farabow, Garrett & Dunner, L.L.P.

[57] ABSTRACT

A method of determining lattice point data of a look-up table for transforming input color coordinates into colorant coordinates of a color image output device, or of reconstructing the same by using a differentiable-continuous function. An input-output characteristic of the device is determined by using a differentiable-continuous function based on discrete transformation pairs, and coefficients of color transformation that uses a look-up table or a continuous function is determined based on the thus-determined differentiable-continuous function.

16 Claims, 21 Drawing Sheets

METHOD AND APPARATUS FOR DETERMINING COLOR TRANSFORMATION COEFFICIENTS

BACKGROUND OF THE INVENTION

1. Field of the Invention

The present invention relates to a color transforming apparatus used in color image processors such as color copiers and color printers and, in particular, to a method and an apparatus for determining coefficients of color transformation which are used in the above color transforming apparatus. More particularly, the invention concerns a method and an apparatus for determining lattice point data of a look-up table used for color transformation or coefficients of differentiable-continuous function type color transformation.

2. Description of the Related Art

In a color copier, for instance, a color original is read by a color-image input device, the light from the color original is separated into three color components of red, green, and blue, thereby obtaining RGB signals. These RGB signals are transformed into L*a*b* signals. The L*a*b* signals are transformed into YMCK signals corresponding to yellow, magenta, cyan, and black colorants, so as to form a color image on recording paper by a color-image output device.

In the transformation from the L*a*b* signals into YMCK signals, a matrix operation in which a product-sum operation of input signals and color transformation coefficients is performed, or a look-up table is generally used.

The look-up table is a table in which relationships between input values and output values each obtained by multiplying the input values by predetermined color transformation coefficients are stored in advance in a read-only memory (ROM) or a random-access memory (RAM), to effect transformation directly from the L*a*b* signals into YMCK signals. In a case where color transformation is effected by using this look-up table, since an operation time is virtually not required, there is an advantage in that the color transformation can be effected at a very high speed.

The color transformation coefficients for the look-up table are frequently obtained experimentally by trial and error such that the gradation and tone of a color original will be reproduced faithfully when the color original is read by a color-image input device and a reproduced image is actually outputted on recording paper.

Namely, conventionally, there have been cases where estimated values based on a printing or optical model are set as lattice point data of the look-up table on the basis of actually measured values. Incidentally, the lattice point is a point designated by predetermined L*, a*, and b* indicated by an index of the look-up table, and the lattice point data is a post-transformation value corresponding to the lattice point, i.e., the predetermined L*, a*, and b*.

Also, there have been cases where estimated values are obtained by polynomials or other mathematical models.

With respect to output devices, studies in which errors are reduced by modeling input-output characteristics by neural networks are known (e.g., refer to Motohiko Naka, Mie Saito, and Kunio Yoshida: "Color Correction of Color Hard Copy Through Neural Network," Transactions of Study Group of The Institute of Image Electronics Engineers of Japan, 1989). However, no consideration has been given to the use of a neural network in determining the lattice point data of the look-up table.

Generally, in the field of production printing, as shown in FIG. 1B, a plurality of color-image input devices (a drum scanner 1-1, a photo CD 1-2, and a flatbed scanner 1-3) and a plurality of color-image output devices (an image setter 3-1, a color-proofing printer 3-2, and a low-resolution desktop printer 3-3) are generally connected to a host computer 2, and devices are selectively used depending on applications. Since the respective color input-output devices input or output color by means of color signals peculiar to the devices, even if colors are equal, corresponding color signals of the respective devices are not necessarily equal. In such a situation, color matching between an original and an output and color matching between the printed matter for color proofing and the final printed matter are difficult. Accordingly, to overcome this problem, color management systems (CMSs) typified by ColorSync 1.0 by Apple Computer, Inc. and EfiColor by EFI Electronics have come to be used. In these CMSs, attempts have been made to achieve color matching between different devices on the basis of groups of information on device characteristics describing the characteristics of various input-output devices prepared in advance.

However, since the aforementioned CMSs had problems in accuracy and the interchangeability of the groups of information on device characteristics, a method of describing the information on device characteristics has been proposed by Intercolor Consortium (ICC), and has come to be used extensively. According to the ICC's method of describing the information on device characteristics, it is possible to obtain the interchangeability of the groups of information on device characteristics, which has been a drawback of the conventional CMSs.

Since the ICC's method of describing the information on device characteristics is based on a large-scale look-up table and linear interpolations, it is possible to obtain high accuracy as compared with the conventional CMSs.

However, with the above-described models using printing, optics, polynomials, or the like, not only is the estimation error large, but a failure sometimes occurs in color reproduction. In addition, with respect to output devices, in the case of those using neural networks, an input to an output device is estimated from color coordinates such that the error in color signals from the output device is minimized, and the error in a uniform color space of the output result is not minimized. Since the visual perception of humans corresponds to a uniform color space, even if the error in color signals from the output device is merely minimized, the error in visual perception cannot be made sufficiently small.

In addition, in a case where color transformation coefficients are determined by using neural networks, although the accuracy is high, there is a problem in that a very long time and hardware are required for calculation.

Under the present circumstances, since a very large-scale look-up table cannot be easily mounted, mounting is effected in the form of software, or a small-scale look-up table is used. However, the mounting in the form of software presents a problem in the speed of color transformation, and the small-scale look-up table presents a problem in that the accuracy declines.

An ICC profile stores both a table for transforming device-dependent color signals into device-independent signals and a table for transforming device-independent signals into device-dependent signals, but only a table in the forward direction is actually used between them. If a table in the reverse direction is also used jointly at the time of interpolation, it is possible to reduce the interpolation error, but it is difficult to do so in the case of a look-up table in terms of its basic principle. In addition, although high accuracy can be obtained with respect to an independent color transformation, if a plurality of color transformations are synthesized, an interpolating operation becomes necessary. If the color transformation is repeated, there is a problem in that the interpolation errors are accumulated.

SUMMARY OF THE INVENTION

Accordingly, an object of the present invention is to prepare lattice point data for realizing a look-up table which permits color transformation with approximately the same accuracy as a neural network, and to prepare coefficients of a differentiable-continuous function typified by a neural network. Another object of the present invention is to reduce interpolation errors by restructuring color reproduction characteristics of input/output devices by using a differentiable-continuous function.

The present invention provides a method of determining lattice point data of a look-up table for transforming input color coordinates into colorant coordinates of a color image output device, or for reconstructing the same by using a differentiable-continuous function. The above method is characterized by determining an input-output characteristic of the device by using a differentiable-continuous function based on discrete transformation pairs, and determining, based on the thus-determined differentiable-continuous function, coefficients of color transformation that uses a look-up table or a continuous function.

Referring to FIGS. 2 and 9 to 11, a description will be given of the operation in accordance with the present invention.

As shown in FIG. 9, the calculation of color transformation coefficients and color transformation in the present invention are operated in the order of the designation of an input device and an output device (Step 1100), the calculation of color transformation coefficients (Step 1200), the setting of the coefficients in an operating device (Step 1300), and a command for execution of image transformation (Step 1400). Hereafter, this procedure will be described with reference to the drawings.

First, referring to FIGS. 9–11, a description will be given of the designation of an input device and an output device (Step 1100). In the designation of an input device and an output device (Step 1100), the designation of input-output devices is given by application software 42 (see FIG. 2) or the device driver 43. At this juncture, when a plurality of items of color transformation processing which are carried out consecutively are effected in batches, there are cases where a plurality of input-output devices are designated.

When the designation is given, an input-device characteristic information group 21 and an output-device characteristic information group 23 are retrieved (Step 1101), and if the device-characteristic information is not present in the device-characteristic-information storage means 22, characteristic information is acquired from the device-characteristic calculating means 25 (Step 1110). When the characteristic information is acquired (Step 1110), necessary input-output characteristic information differs depending on the form of color transformation. Table 1 is a table illustrating the input-output characteristic information required depending on the form of color transformation.

TABLE 1

| Form of color transformation | Input characteristic information | Output characteristic information | Functions of color transformation coefficient calculating means | Input signal | Output signal |
|---|---|---|---|---|---|
| Device-dependent color to device-dependent color | Used | Used | - Coupling of input and output characteristic information<br>- Calculation of coefficients for operating device | Device-dependent | Device-dependent |
| Device-dependent color to device-independent color | Used | Not used | Calculation of coefficients for operating means | Device-dependent | CIE color |
| Device-independent color to device-dependent color | Not used | Used | Calculation of coefficients for operating means | CIE color | Device-dependent |
| Device-independent color to device-independent color | Not used | Not used | Calculation of coefficients for operating means from defining equations | CIE color | CIE color |

FIG. 2 shows elements of the apparatus in accordance with the present invention, and a device-characteristic-information storage means 22, a device-characteristic calculating means 25, a color-transformation-coefficient calculating means 20, and an operating means 24 are disposed in a host computer 2. Through an interlocking operation with a rendering device 41, application software 42, and a device driver 43 which are conventionally available, the host computer 2 controls the display of image data from an input device 1 on a display 44, the adjustment of image data by the application software 42, and the generation of image data for the output device 3.

In the case of an input device, each item of characteristic information is acquired in the procedure shown in the acquisition of input-device characteristic information (Step 1120), as shown in FIG. 10. In the case of an output device, each item of characteristic information is acquired in the procedure shown in the acquisition of output-device characteristic information (Step 1130), as shown in FIG. 11.

In the acquisition of input-device characteristic information (Step 1120), color chips (e.g., ISO IT 8/7.1, 2) whose device-independent intermediate signals (e.g., 1976 CIE L*a*b*) are known in advance are inputted via the device driver 43. The input image data and characteristic evaluation test data 25-1, i.e., intermediate signals which are not dependent on known devices, are transmitted to calorimetrically operating means 25-2 disposed in the device-characteristic calculating means 25.

The calorimetrically operating means 25-2 receives the characteristic evaluation test data 25-1 which are intermediate signals not dependent on known devices, i.e., data on a prescribed characteristic evaluation test, from the device driver 43 (Step 1121). Similarly, the calorimetrically operating means 25-2 also receives input image data, i.e., data corresponding to the data on the prescribed characteristic evaluation test (Step 1122). The calorimetrically operating means 25-2 calculates and transmits characteristic information of the same format as that of the input-device characteristic information stored in the device-information storage means 22, from the corresponding pairs of the characteristic evaluation test data 25-1 and input-device data corresponding thereto (Step 1123). At this juncture, since the data given to the calorimetrically operating means 25-2 is a table comprising one or more corresponding pairs of transformation including discrete pre-transformation values and post-transformation values, so that this table is approximated by a differentiable continuous function typified by a neural network which will be described later.

In the acquisition of output-device characteristic information (Step 1130), as the characteristic evaluation test data 25-1, a data set for an output device (e.g., ISO IT 8/7.3) is transmitted to one of color-image output devices 3-1 to 3-3 via the device driver 43, so as to be outputted (Step 1131). A printed sample thus outputted is measured by an unillustrated calorimetrically measuring portion, and is transformed into device-independent intermediate signals (e.g., 1976 CIE L*a*b*) (Step 1132). At this juncture, since the data given to the calorimetrically operating means 25-2 is a table comprising one or more corresponding pairs of transformation including discrete pre-transformation values and post-transformation values, so that this table is approximated by a differentiable continuous function typified by a neural network which will be described later.

When the table comprising one or more corresponding pairs of transformation, typified by the lattice point data of the look-up table, is given as the characteristic of the input-output device, and the differentiable-continuous function is thereby formed, approximation is possible by the differentiable continuous function typified by the neural network which will be described later. In a case where information indicating the distinction as to whether the respective corresponding pairs fall within or outside a color-reproducible range has been given, the accuracy of approximation of the differentiable-continuous function improves if the corresponding pairs falling outside the color-reproducible range are omitted. The characteristic information acquired in the above-described manner is transmitted to the device-information storage means 22 (Step 1133).

In the case where a plurality of items of color transformation processing which are usually effected consecutively are effected en bloc, a plurality of input-output devices may be designated. In this case, it is possible to calculate color transformation coefficients in batches by retrieving or acquiring the characteristic information of the input-output devices individually with respect to each color transformation, and by synthesizing a differentiable-continuous function.

Next, in the calculation of color transformation coefficients (Step 1200), coefficients required for the operating device are calculated by using the differentiable-continuous function obtained by the designation of an input device and an output device (Step 1100) or a composite function of the differentiable-continuous function and a defining expression.

In the case where the operating device is constituted by a look-up table, transformation values can be obtained by applying lattice-point coordinate values to the differentiable-continuous function obtained by the designation of an input device and an output device (Step 1100) or the composite function of the differentiable-continuous function and the defining expression.

In a case where the operating device is a differentiable-continuous function equal to the color-transformation-coefficient transforming means, the aforementioned color transformation coefficients can be directly used as the coefficients of the operating device.

In a case where the operating device is a differentiable-continuous function different from the color-transformation-coefficient transforming means, the coefficients of the operating device are determined in such a manner that the approximation error in a color-reproducible range becomes very small. For example, in a case where the color-transformation-coefficient transforming means is a polynomial of higher order, and the operating device is a neural network, the coefficients of the operating device can be obtained by transforming an appropriate group of input values within the color-reproducible range into a group of post-transformation output values by the polynomial of higher order for calculating the color transformation coefficient, and then learning the group of input values and the group of output values by a learning method typified by back propagation learning. At this juncture, it is possible to improve the visual color accuracy if the distance in an appropriate uniform color space, i.e., the color difference, is used as an energy function for evaluating the error. When the energy function is calculated, there are cases where the differentiable-continuous function for determining the color transformation coefficients can be used by being partially differentiated.

In addition, in a case where the color-transformation-coefficient calculating means is a neural network based on computer simulation, and the operating device is a neural network using an analog circuit, it is possible to obtain the coefficients of the operating means by transforming an appropriate group of input values within the color-reproducible range into a group of post-transformation output values by the neural network for calculating the color transformation coefficient, and by learning the group of input values and the group of output values by a learning method typified by back propagation learning. As an example of the mounting of a neural network using an analog circuit, a device disclosed in Japanese Unexamined Patent Publication No. Hei. 6-274662 is known. Although in the case of the mounting using an analog circuit there is a problem in that errors and changes over time are encountered, it is possible to correct the error by using a learning method typified by back propagation learning.

In addition, according to Funabashi: "On approximately realizing continuous mapping using a neural network," Technical Report of The Institute of Electronics, Information and Communication Engineers, MBE, 88–9, 1988, a neural network is capable of approximating with arbitrary accuracy a continuous function defined in a bounded closed set. Also, the neural network is capable of approximating finite input-output correspondences by the back propagation method. At that juncture, it is also possible to estimate input-output correspondences which were not learned, by adjusting the configuration of the neural network and various constants for learning. Furthermore, if color chips are prepared and are calorimetrically measured during learning, the error at the time of output or during measurement is added to the measured result. Generally, this error has no correlation with the measured result. In a case where the number of items of data is sufficiently large as compared with the scale of the neural network, such errors are substantially eliminated during learning by virtue of the characteristics of the neural network. Accordingly, even if errors are contained in the input-output correspondences in the measured result, the neural network after learning is capable of effecting approximation in which the errors are substantially eliminated.

After the color transformation coefficients obtained in the above-described manner are set in the operating means 24 (Step 1300), upon receipt of an instruction for executing image transformation (Step 1400), the operating means 24 acquires an image from the device driver (Step 1410), and executes transformation (Step 1420). The transformed result is transmitted to the device driver (Step 1430).

DESCRIPTION OF THE PREFERRED EMBODIMENTS

Figure 1A:
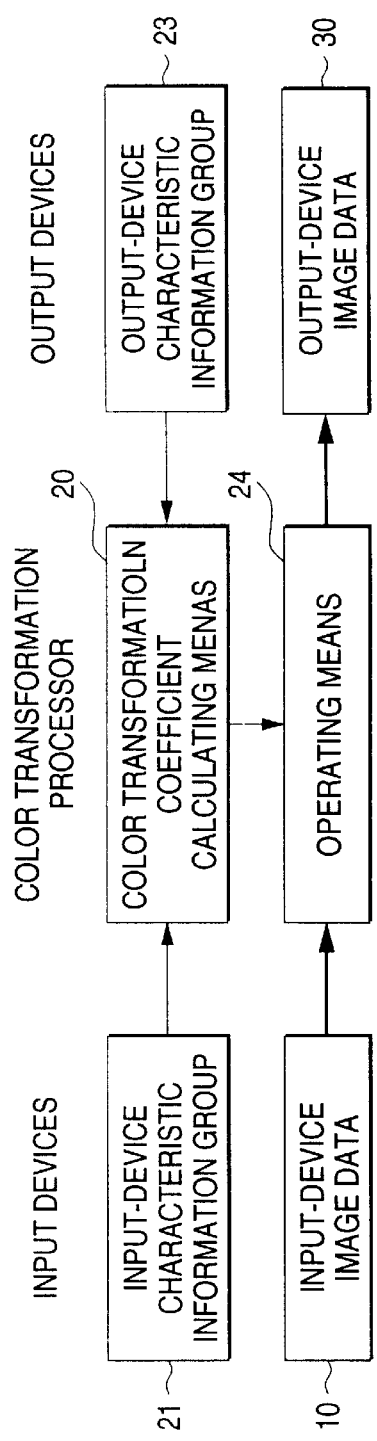
FIGS. 1A and 1B illustrate the fact that, in the field of production printing to which the present invention is mainly applied, a plurality of color-image input devices are connected, and are selectively used, as required, according to a use.

Referring now to the drawings, a specific description will be given of the present invention on the basis of the embodiments.

In the conventional desktop color publishing systems and color copiers, the inputting, editing, and outputting of a color document are effected on the precondition that a particular mono-color image input device and a color-image preparing device are used. In a color copier, for example, since an input section is incorporated in the apparatus, a print output is carried out from the input with respect to a particular color of an original, and one-to-one color transformation processing is effected from an input color signal into a recording color signal so that a print output and the color of the original will match.

In addition, in the field of desktop color publishing as well, by using a combination of a flatbed scanner, a personal computer, and a desktop printer, RGB signals inputted by the flatbed scanner are generally transformed into CMYK signals for the desktop printer by simple processing using application software on the personal computer, and are then outputted.

However, in conjunction with the diversification of color input/output media, a network-shared documentation environment is being formed in which a plurality of color image input-output devices are arranged via a network, and a plurality of workstations use the same by sharing them. In the field of production printing centering on printing, in particular, a system configuration such as the one shown in FIG. 1B has come to be generally used.

Figure 1B:
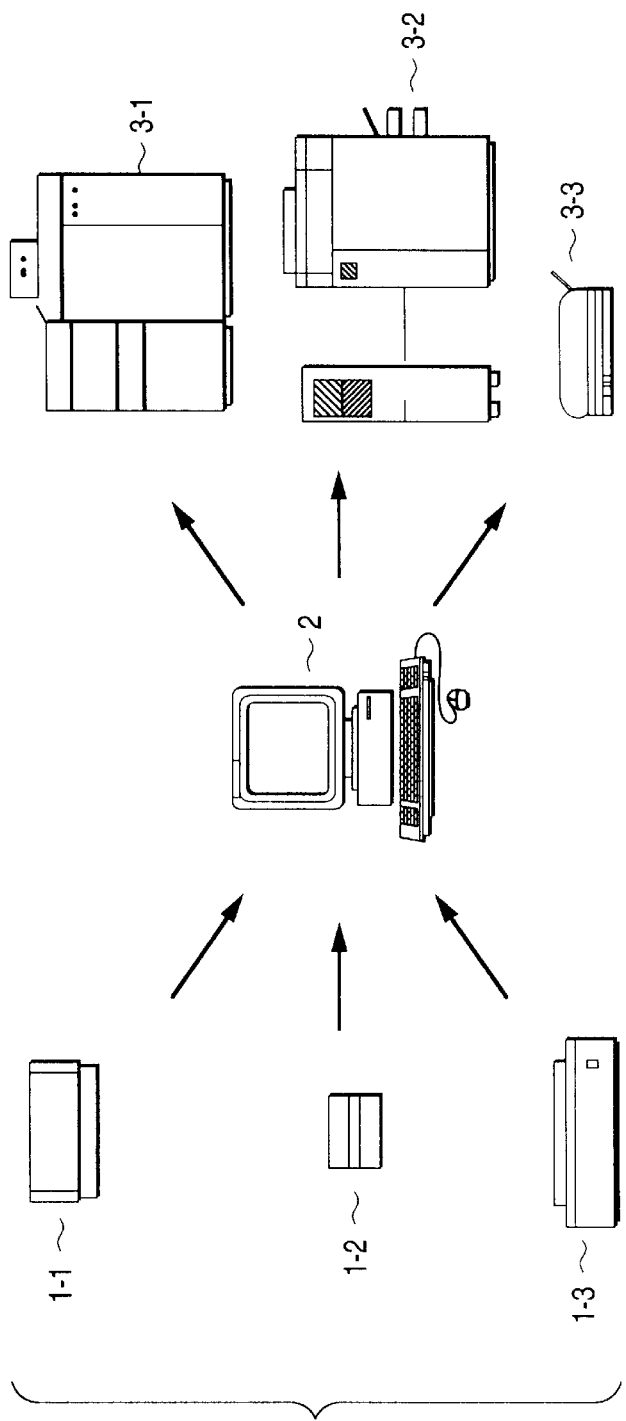

As shown in FIG. 1B, in the field of production printing, a plurality of color-image input devices 1-1 to 1-3 and a plurality of color-image output devices 3-1 to 3-3 are connected to a host computer 2 via a local area network (LAN) typified by Ethernet (registered trademark). The color-image input devices include, for example, the flatbed scanner 1-3 for inputting a reflecting original, the drum scanner 1-1 for inputting a film, and the photo CD drive 1-2, and are respectively connected to the host computer 2, typified by a Macintosh (registered trademark) by Apple Computer, Inc., in the form of an application plug-in. At that time, color-image editing software, typified by Adobe Photoshop (registered trademark) by Adobe Systems Inc., is used as application software, and photographic images are mainly inputted. In addition, in the host computer 2, illustrations, graphs, and the like are generated by graphics software, such as ProIllustrator by Adobe Systems Inc. Also, character documents are generated by the host computer 2 by the use of word-processing software.

The character documents, illustrations, graphs, and photographic images which are thus fetched as digital data are layout-edited as image elements of a desired color document. In the layout editing, the aforementioned image elements are laid out by using page-layout software such as PageMaker by Adobe Systems Inc. and Aldus Corp., to form a desired color document. The prepared color document is transmitted to the desktop printer 3-3 or the color-proofing printer 3-2 at a low resolution of 150 to 200 dpi or thereabouts, and the layout and color reproduction are checked on hard paper. After the document is accepted in these proofing steps, the color document is transmitted to the image setter 3-1 at a high resolution of 300 to 400 dpi or thereabouts so as to be subjected to electronic platemaking. The color document which is outputted as a platemaking film is subsequently subjected to the steps of press-plate making and printing, and is completed as printed matter.

In a system configuration comprising the above-described multiple inputs and multiple outputs, the transformations from a multiplicity of input color signals into a multiplicity of output signals needs to be executed for each combination of input and output devices. Moreover, since all these transformations need to be executed on the host computer 2, there are drawbacks in that the load on the host computer 2 becomes enormously large, and that the image files in the host computer 2 increase each time the input and output signals are different. For example, in a case where there are three types of input signals and three types of output devices in the configuration shown in FIG. 1B, 3×3=9 kinds of transformation are required for the process from the preparation of image elements until the output. In addition, even if the object of the image is identical, 9 kinds of files can be formed depending on what input-output devices for the image are used.

As a method of avoiding such a problem, in the present invention, the processing is separated into a step in which an input signal is transformed into an intermediate signal and a step in which the intermediate signal is transformed into an output signal. As such an intermediate signal is provided as an intermediary, the step of preparing the image elements and the step of outputting an image described in FIG. 1B are separated, so that there is an advantage in that in a case where desired color reproduction has not been obtained in the output step, it is possible to systematically trace back where the step requiring correction is present, without relying on the knack and experience of the operator. In addition, as another advantage, it is possible to reduce the kinds of color transformation in the process ranging from the preparation of image elements to the output by virtue of the intermediary of the intermediate signal, and to reduce the number of files. For instance, in a case where there are three kinds of input signals and three kinds of output devices in the configuration shown in FIG. 1B, the number of kinds of color transformation between the input signal and the intermediate signals becomes 3, and the number of kinds of color transformation between the intermediate signal and the output signal becomes 3, for a total of 6 kinds, with the result that a reduction is possible from 9 kinds to 6 kinds.

For this reason, in the present invention, as shown in FIG. 1A, characteristic information describing the relationships between signals which are dependent on each device and intermediate signals which are independent of the device are retrieved from an input-device characteristic information group 21 and an output-device characteristic information group 23 which have been acquired or prepared in advance. A color-transformation-coefficient calculating means 20 temporarily prepares transformation coefficients necessary for a desired input/output color transformation by the designation of the input-device characteristic information and the output-device characteristic information. The color transformation coefficients prepared by the color-transformation-coefficient calculating means 20 are introduced into an operating means 24 for performing an operation of a look-up table or an operation of differentiable functions. The operating means 24 transforms designated input-device image data 10 into designated output-device image data 30 by using the color transformation coefficients thus introduced. Incidentally, in FIG. 1A, thick arrows indicate the flow of an image, while thin arrows indicate the flow of the coefficients.

Figure 2:
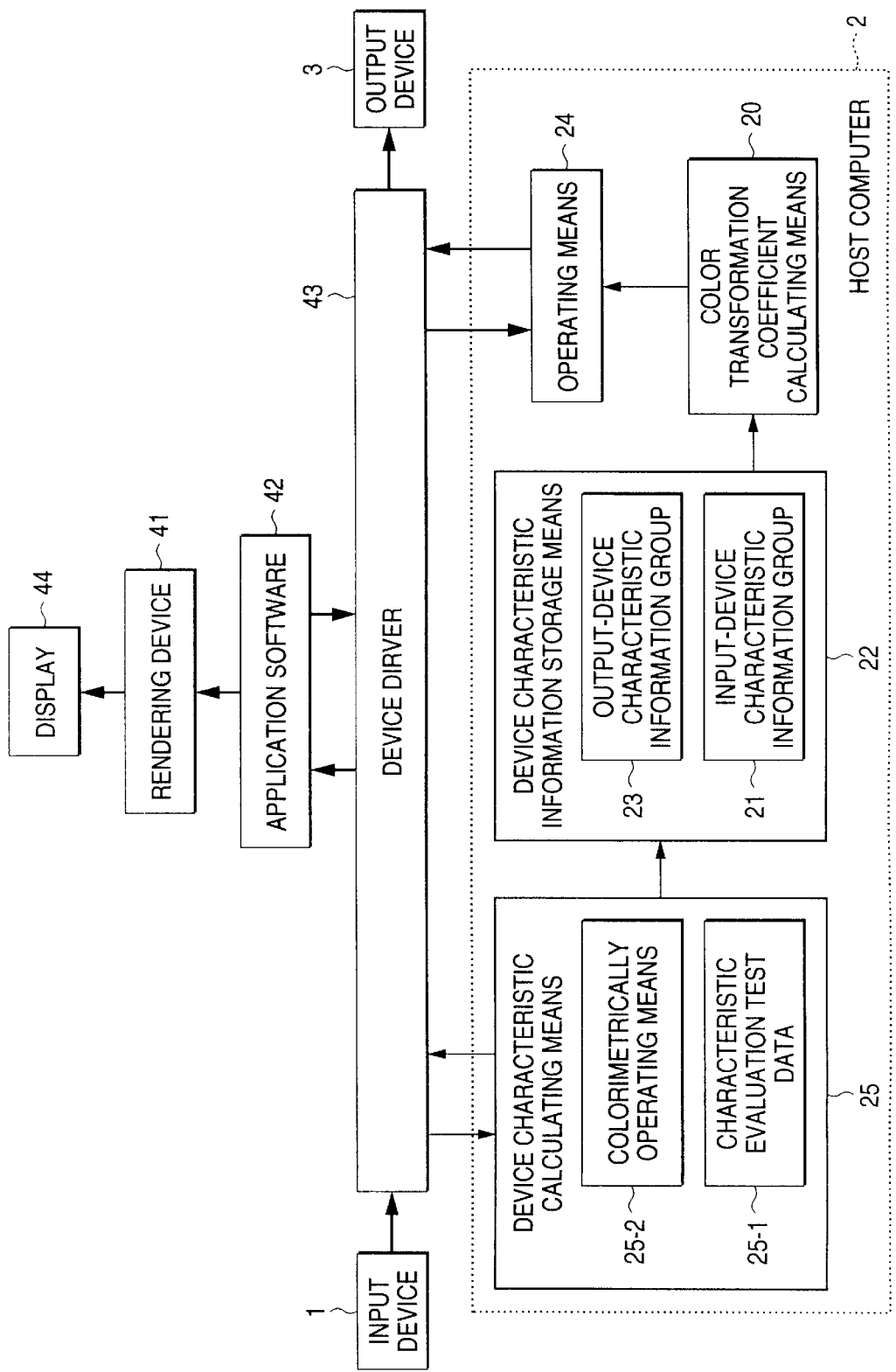
FIG. 2 illustrates a more specific configuration of processing concerning color transformation coefficients and an image in accordance with the present invention.

A more specific configuration is shown in FIG. 2. A device-characteristic-information storage means 22, a device-characteristic calculating means 25, the color-transformation-coefficient calculating means 20, and the operating means 24 in the present invention are disposed in the host computer 2. Through an interlocking operation with a rendering device 41, application software 42, and a device driver 43 which are conventionally available, the host computer 2 controls the display of image data from the input device 1 on a display 44, the adjustment of image data by the application software 42, and the generation of image data for the output device 3.

The device-characteristic calculating means 25 includes characteristic evaluation test data 25-1 and a calorimetrically operating means 25-2, and prepares device-characteristic information data of a predetermined format which is set in the device-characteristic-information storage means 22, by using the calorimetrically operating means 25-2 by using as corresponding pairs the characteristic evaluation test data 25-1 prepared in advance and device-dependent data obtained by observing the characteristic evaluation test data through the input-output devices.

When input-device characteristic information is acquired, the characteristic evaluation test data 25-1 are device-independent intermediate signal values of color chips (e.g., ISO IT 8/7.1, 2) whose device-independent intermediate signals (e.g., 1976 CIE L*a*b*) are known in advance. Meanwhile, the color chips themselves are set on the color-image input devices 1-1 to 1-3, and their input image data are transmitted to the calorimetrically operating means 25-2 set in the device-characteristic calculating means 25, via the device driver 43. The calorimetrically operating means 25-2 prepares the aforementioned device-characteristic information data by using as corresponding pairs the aforementioned input image data and the device-independent intermediate signal values from the characteristic evaluation test data 25-1.

When output-device characteristic information is acquired, the characteristic evaluation test data 25-1 is a data set for an output device (e.g., ISO IT 8/7. 3), and is transmitted and outputted to the color-image output devices 3-1 to 3-3 via the device driver 43. An outputted print sample is measured by an unillustrated calorimetric section, and is transformed into device-independent intermediate signals (e.g., 1976 CIE L*a*b*). The calorimetrically operating means 25-2 prepares the aforementioned device-characteristic information data by using as corresponding pairs the data set for an output device for the characteristic evaluation test data 25-1 and the aforementioned device-independent intermediate signal values.

On receiving an instruction from the application software 42 or the device driver 43, the color-transformation-coefficient calculating means 20 retrieves input-device characteristic information and output-device characteristic information in the device-characteristic-information storage means 22, and temporarily prepares transformation coefficients necessary for a desired input/output color transformation. The color transformation coefficients prepared by the color-transformation-coefficient calculating means 20 are introduced into the operating means 24 for performing an operation of a look-up table or an operation of differentiable functions. After the color transformation coefficients are introduced into the operating means 24, a series of image data inputted from application software 42 or the device driver 43 are processed by the operating means 24, are transformed into image data for a desired output device, and are then transmitted to the application software 42 or the device driver 43. As described above, the apparatus in accordance with the present invention effects the calculation of transformation coefficients and the operation of color transformation for transforming color attribute values between the respect input and output devices through an interlocking operation with the application software 42 or the device driver 43 in the host computer and in response to a request from each of them.

Figure 3:
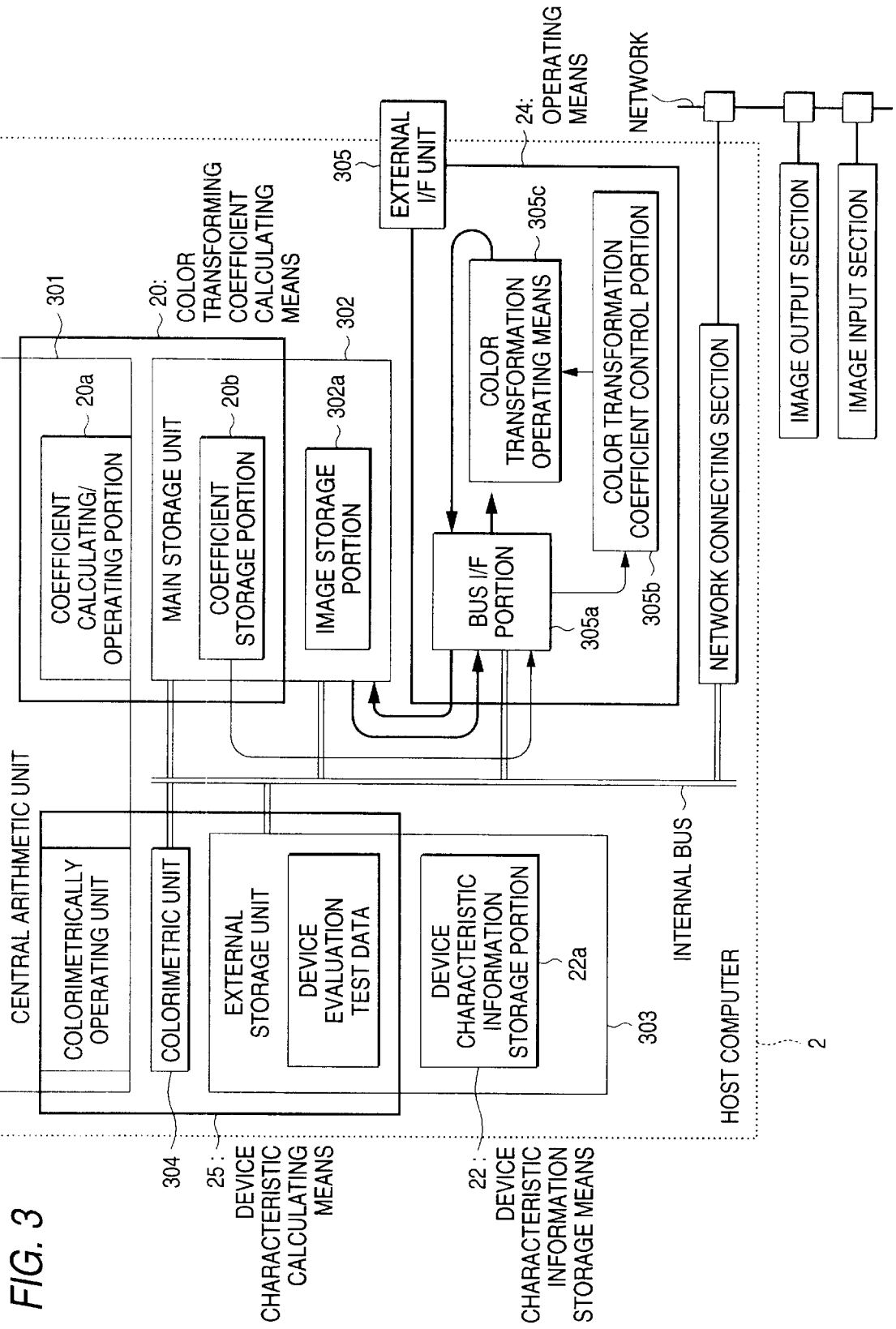
FIG. 3 illustrates an example of an embodiment in which the present invention is realized in a host computer.

FIG. 3 shows an example of the embodiment in which the present invention is implemented within the host computer. The apparatus of the present invention is comprised of a central arithmetic unit 301, a main storage unit 302, an external storage unit 303, a colorimetric unit 304, and an external interface unit 305.

In FIG. 3, the color-transformation-coefficient calculating means 20 is comprised of a coefficient calculating/operating portion 20a constituted by software in the central arithmetic unit 301 and a coefficient storage portion 20b which is temporarily prepared in the main storage unit 302. The device-information storage means 22 is stored in the external storage unit 303 as a device-information storage portion 22a in the form of a database, and is arranged to be retrievable by the device name of each input-output device. The operating means 24 is configured as the external interface unit 305 expanded in the internal bus, and is comprised of a bus interface portion 305a, a color-transformation-coefficient controlling portion 305b, and a color-transformation operating portion 305c.

The color transformation coefficients in the main storage unit 302 generated by the color-transformation-coefficient calculating means 20 are controlled by a register controlling portion (not shown) in the color-transformation-coefficient controlling portion 305b via the bus interface portion 305a, and are set in a register (not shown) in the color-transformation operating portion 305c. As for the transformation of the image data, the application software 42 or the device driver 43 sets the image data subject to transformation in an image storage portion 302a in the main storage unit 302. The image data thus set are transmitted to an input buffer (not shown) in the color-transformation operating portion 305c via the bus interface portion 305a. The image data transmitted to the input buffer (not shown) are processed in a line-sequential manner, and the image data after processing are accumulated in an output buffer (not shown). The image data accumulated in the output buffer (not shown) are transmitted to relevant addresses in the image storage portion 302a within the main storage unit 302 via the bus interface portion 305a. At that time, the bus interface portion 305a controls the aforementioned input and output operations, and normally switches over the input operation and the output operation in response to the status (almost full or almost empty) of the input and output buffers. The color-transformation operating portion 305c performs an operation of the look-up table or an operation of differentiable functions. The operation of the look-up table will be described later with reference to FIGS. 4 and 5, and the operation of differentiable functions will be described later with reference to FIGS. 6 and 7.

The device-characteristic calculating means 25 is comprised of the calorimetric unit 304 connected to the bus and characteristic evaluation test data stored in the external storage unit 303. In response to a command for acquiring device characteristics from the application software 42 or the device driver 43, the colorimetric unit 304 supplies the characteristic evaluation test data in the external storage unit 303, and receives data corresponding thereto. The calorimetric unit 304 performs an operation by using as corresponding pairs the characteristic evaluation test data and the device-dependent data obtained by observing the same through the input-output devices, and prepares and registers predetermined device-characteristic information data in the device-characteristic-information storage means 22 stored in the external storage unit 303 in the form of a database.

Referring now to FIGS. 4–7, a detailed description will be given of an example of the color-transformation operating portion 305c.

Figure 4:
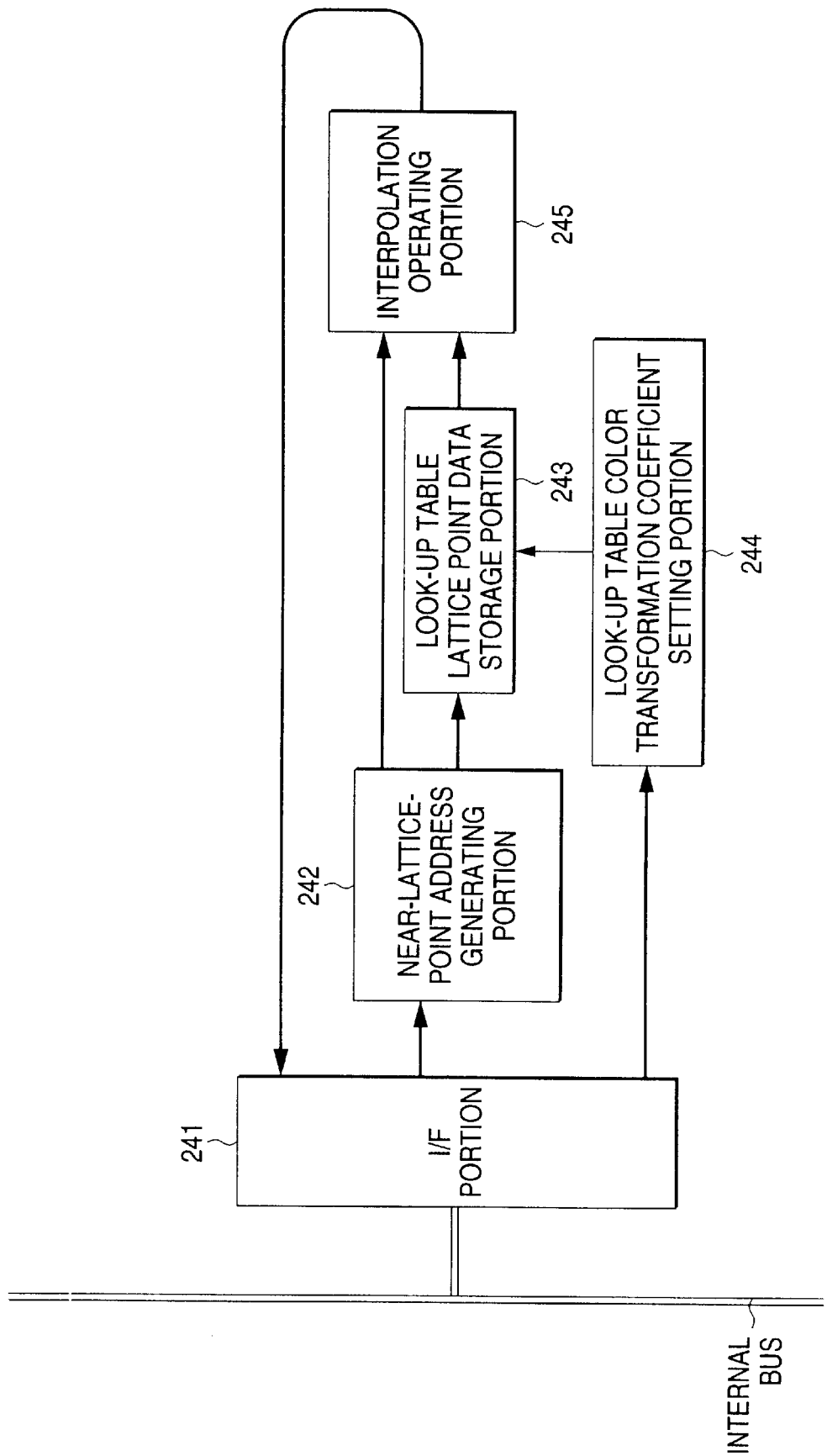
FIG. 4 is a first part of a diagram illustrating a configuration and a basic principle of interpolation in a case where a look-up table is used as a color transforming portion in accordance with the present invention.

FIG. 4 shows an example in which the color-transformation operating portion 305c performs an operation of a look-up table. Basic operating portions for the operation of a look-up table include a near-lattice-point address generating portion 242, a look-up table lattice-point data storage portion 243, and an interpolation operating portion 245. In addition, an interface portion 241 and a look-up table color-transformation-coefficient setting portion 244 are provided for these basic operating portions.

Of the respective 8 bits of the input color signal, the four high-order bits are inputted to the near-lattice-point address generating portion 242, which in turn generates addresses of eight near lattice points including an input point, and consecutively sends 8-bit data for an image output device being stored to the interpolation operating portion 245, while referring to the look-up table lattice-point data storage portion 243. In this embodiment, the data for eight points are serially transmitted, and, in order to effect high-speed transmission, it suffices if an arrangement is provided such that eight look-up table lattice-point data storage portions 243 are provided, and are referred to simultaneously (not shown). The interpolation operating portion 245 performs an interpolation operation with respect to the data on the eight near points and the four low-order bits of the eight bits of each input color signal, and generates an output signal.

Figure 5:
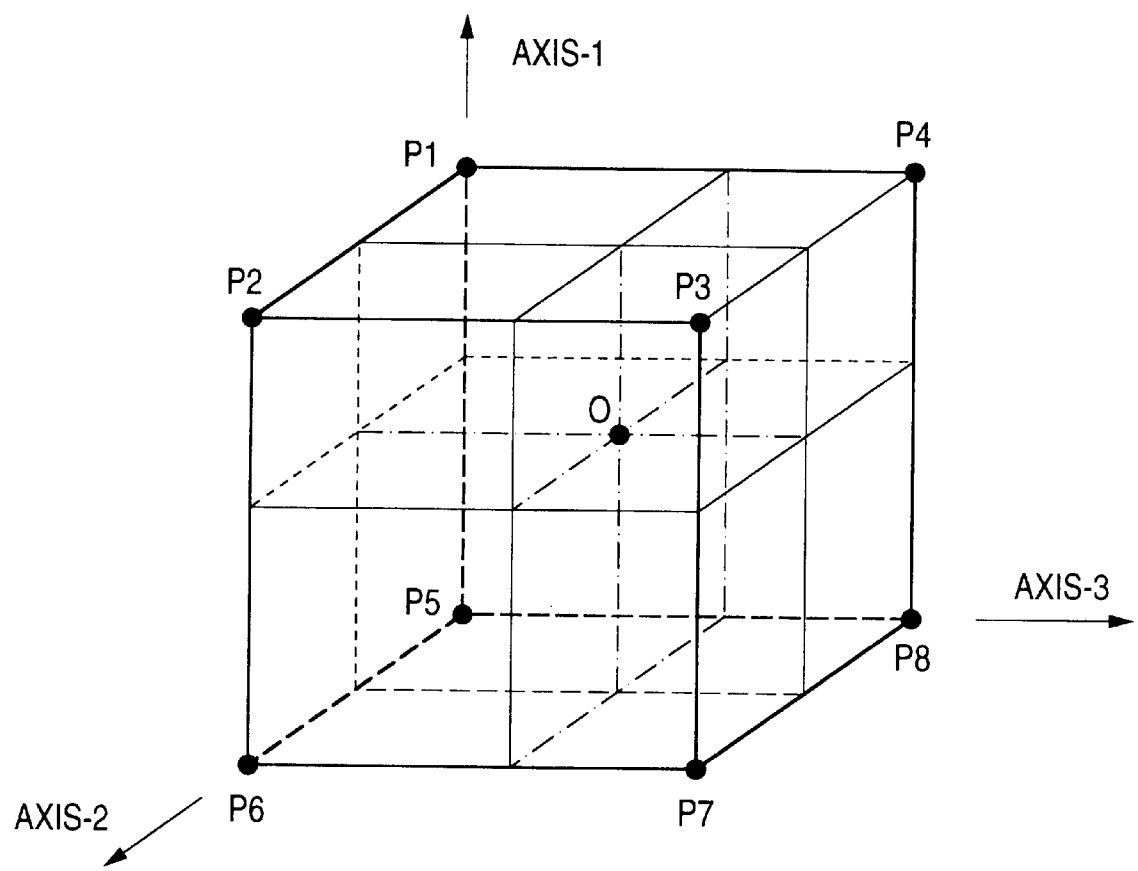
FIG. 5 is a second part of the diagram illustrating the configuration and the basic principle of interpolation in the case where the look-up table is used as the color transforming portion in accordance with the present invention.

Referring to FIG. 5, a description will be given of a basic principle of the interpolation method implemented in the interpolation operating portion 245. It is assumed that the coordinate of an input color space determined by the eight bits of the input signal is O, and the coordinates of the near lattice point are P1, P2, P3, P4, P5, P6, P7, and P8, and a solid having the eight points from P1 to P8 as vertexes will be referred to as a basic cube. In addition, output data stored in advance in correspondence to P1 to P8 are set as D1, D2, D3, D4, D5, D6, D7, and D8. The relationship between the respective vertexes of the basic cube and the point O therein is determined by the four low-order bits of the eight bits of each input signal. The basic cube cut by planes which respectively pass through the point O and are parallel to a 1-2 plane, a 2-3 plane, and a 3-1 plane, so as to be divided into eight cubes. If it is assumed that the volume of a solid whose diagonal line is a segment connecting P1 and O is V1, the volume of a solid whose diagonal line is a segment connecting P2 and O is V2, the remaining volumes V3 to V8 being determined in a similar manner, the sum of the volumes V1 to V8 is V, and a post-interpolation value corresponding to the position of the coordinate O is Ans, then the interpolation of the cube is expressed by Formula 1.

$$Ans=(D1 \cdot V7+D2 \cdot V8+D3 \cdot V5+D5 \cdot V3+D6 \cdot V4+D7 \cdot V1+D8 \cdot V2)/V \quad (1)$$

Although a cubic interpolation is used in this embodiment, any known interpolation method may be used such as a triangular prism interpolation, an oblique triangular prism interpolation, or a tetrahedral interpolation, which are described in Transactions of 1993 24th Image Conference, pp. 347 to 350. Although in this embodiment the cubic table is divided in 4 bits, i.e., 17 lattice points, it suffices if the cubic table is divided in 8 bits or less, and the table may be divided in different numbers of bits for the respective input signal axes, e.g., in 4 bits, 3 bits, and 3 bits. However, it goes without saying that an interpolating mechanism is not required in a case where all the input signals are 8 bits. Further, although 8 bits are used for each input in this embodiment, any number of bits may be used.

Figure 6:
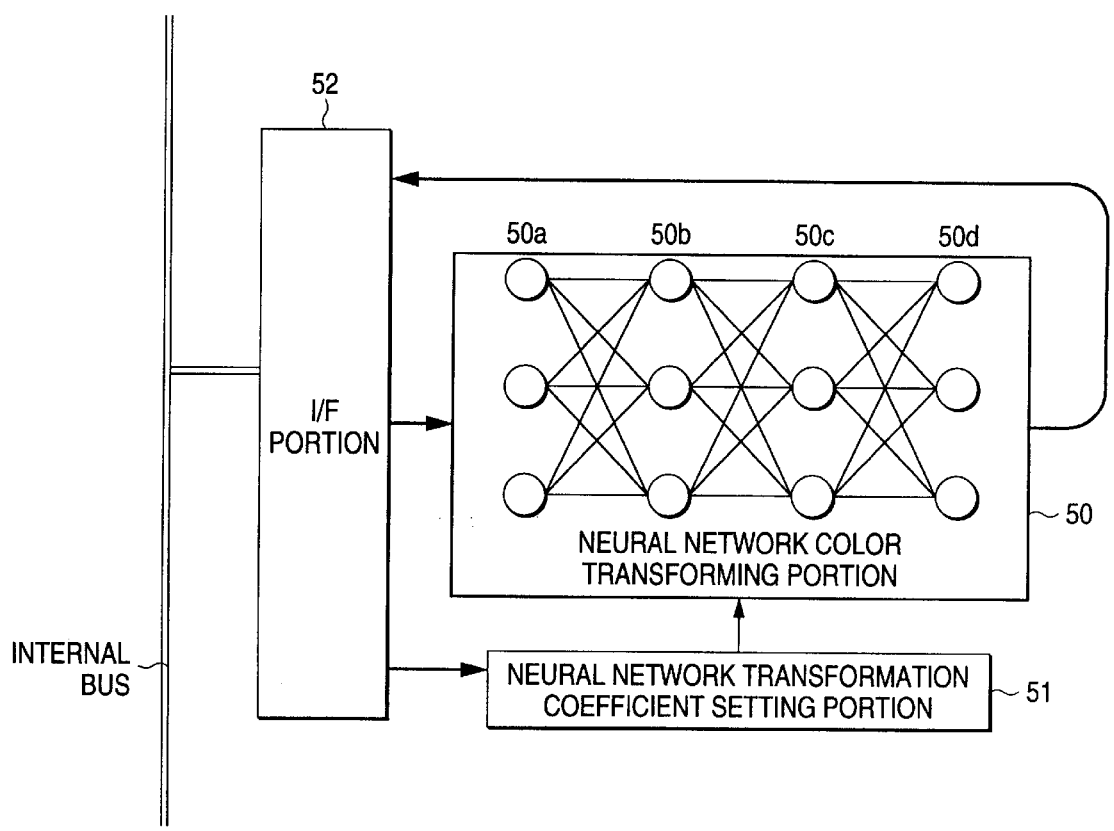
FIG. 6 illustrates a configuration in a case where a neural network is used as an example of a differentiable-continuous function of the color transforming portion in accordance with the present invention.

FIG. 6 shows an example of the embodiment in a case where the color-transformation operating portion 305c uses a neural network which is one of the operations of a differentiable function. FIG. 6 illustrates the scale of the neural network and a form of connection. In the example shown in FIG. 6, a neural network color-transforming portion 50 has an input layer 50a, a first intermediate layer 50b, a second intermediate layer 50c, and an output layer 50d, which are configured with three cells, three cells, three cells, and three cells, respectively. An output value from the output layer 50d is outputted via an interface portion 52. As for the neural network from the input layer 50a to the output layer 50d, the number of the intermediate layers and the numbers of cells may be any numbers. In terms of the form of connection as well, although a form of passage through the input layer the first intermediate layer the second intermediate layer and the output layer is adopted in this embodiment, a form of connection in which a jump takes place may be used. In addition, the nonlinear operation of some cells may be omitted. It should be noted that the color transformation coefficients for the neural network color-transforming portion 50 are set by a neural network color-transformation-coefficient setting portion 51.

Next, referring to FIG. 7, a description will be given of the function of nonlinear units in the operating means which is constituted by nonlinear units, which is one example of the neural network. Inputs $U_i$ (i=1 to n) are output values from the cells of a preceding layer, and are transformed by respective nonlinear operation portions 11a to 11n. A threshold value $\theta_p$ and weights $W_i$ (i=1 to n) are color transformation coefficients which are given by the color-transformation-coefficient calculating means. These are transformed into an output Up by multiplying portions 12a to 12n and an adding portion 13 (Formula 2). Sigmoid functions are generally used for the nonlinear operation portions, and hyperbolic functions are used are used in the embodiments of the present invention. This is the function provided for each nonlinear unit, and as a plurality of nonlinear units are connected, the operating means constituted by the nonlinear units is formed.

$$Up = \sum_{i=1}^{n} \{Wi \cdot \tanh(Ui)\} + \Theta p \quad (2)$$

Figure 7:
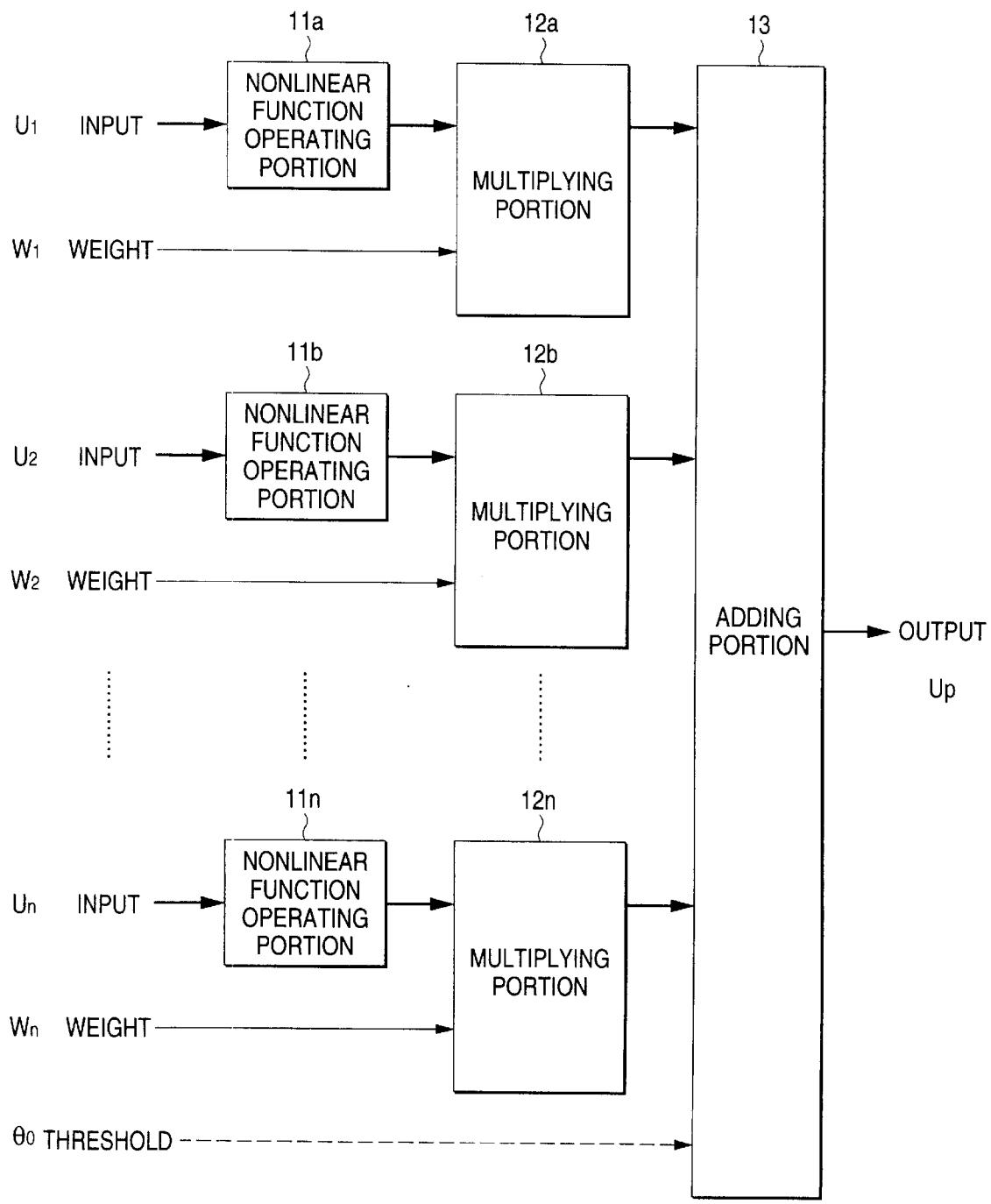
FIG. 7 illustrates an example of a configuration in a case where the differentiable-continuous function of the color transforming portion in accordance with the present invention is mounted by an analog circuit.

The circuit configuration shown in FIG. 7 differs from a circuit configuration which simulates the cells of a conventional neural network. However, when the respective nonlinear units are connected to each other to form a network, the nonlinear units perform an operation equivalent to that of the entire neural network. The configuration of such nonlinear operation units of the present invention can be realized by either a digital circuit or an analog circuit, but particularly in a case where the nonlinear operation units are realized by the analog circuit, there is an advantage in that the circuit can be simplified and the processing speed can be increased as compared with the circuit configuration which simulates the cells of the conventional neural network.

Figure 8:
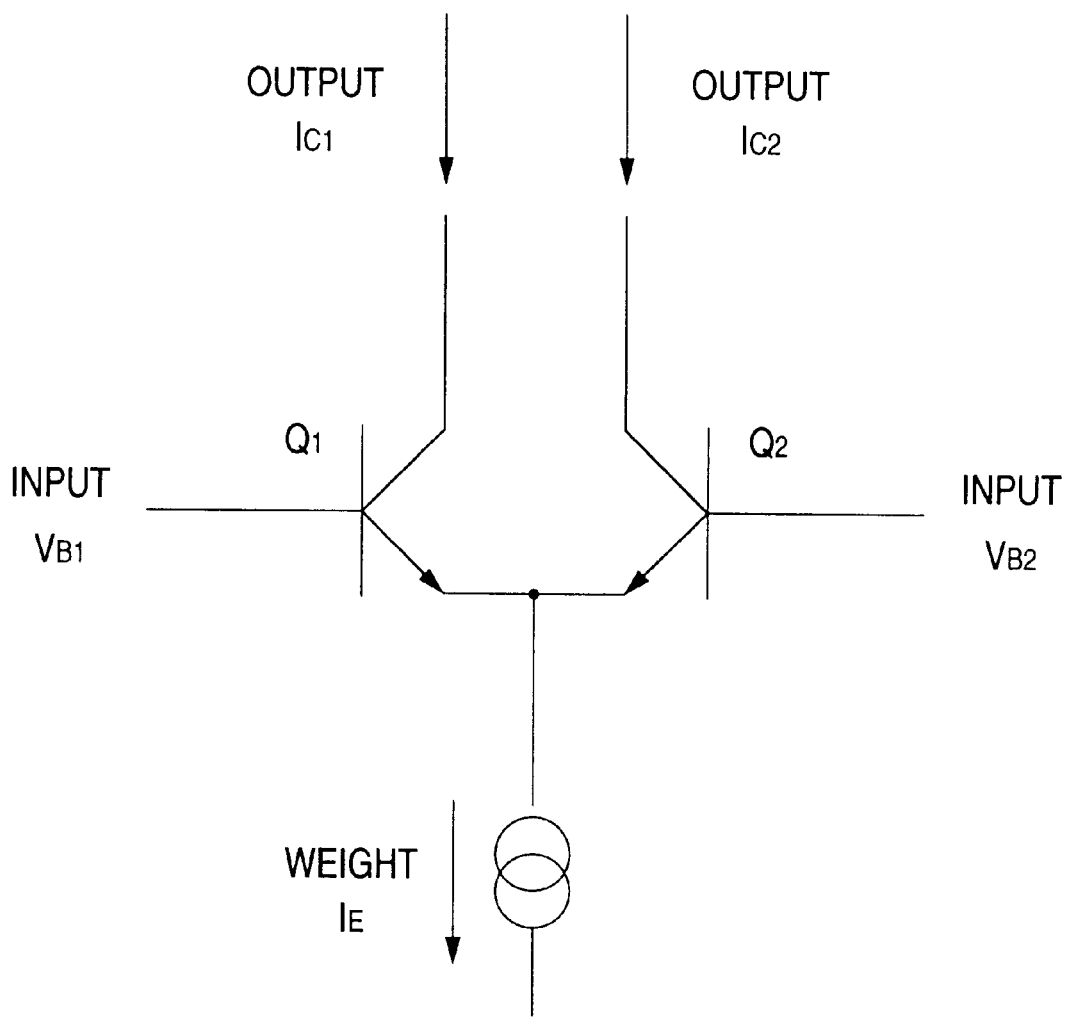
FIG. 8 illustrates another example of the configuration in the case where the differentiable-continuous function of the color transforming portion in accordance with the present invention is mounted by an analog circuit.

Hereafter, referring to FIG. 8, a detailed description will be given of a case where the nonlinear operation units are realized by an analog bipolar circuit. The analog circuit in this case is constituted by a differential amplifier circuit using a pair of bipolar transistors $Q_1$ and $Q_2$ whose first terminals (emitters) are connected to each other. The arrangement provided is such that a voltage difference $V_{B1}-VB_2$ proportional to an input is supplied across second terminals (bases) of the pair of three-terminal amplifier elements making up each differential amplifier circuit, and a current $I_E$ proportional to a weight value for multiplication is supplied, as required, across their first terminals (emitters), thereby to obtain an output as a current difference $I_{C1}-I_{C2}$ of the circuit across their third terminals (collectors).

The difference $I_{C1}-I_{C2}$ between the collector currents $I_{C1}$ and $I_{C2}$ of the two transistors can be expressed as $$I_{C1}-I_{C2}=I_E \cdot \tan h\{(V_{B1}-V_{B2})/2V_T\} \quad (3)$$

That is, in this circuit, the input voltage difference $V_{B1}-V_{B2}$ is provided with a logistic function tan h, and an output current difference $I_{C1}-I_{C2}$ proportional to a value in which the value of that function is multiplied by the weight value $I_E$ is obtained. This characteristic has the aforementioned function whereby each input is provided with a nonlinear function, and is multiplied by an appropriate weight value.

In the above, a description has been given of an example of the configuration of nonlinear operation units in accordance with the present invention by the circuit configuration using bipolar transistors. However, a characteristic including monotonous and bounded functions and multiplication can also be obtained by amplifier elements having three terminals or more and provided with a nonlinear characteristic, such as field-effect transistors operating generally as balanced modulators, electron tubes having a remote cut-off characteristic, and electron tubes having a variable-mu characteristic.

In the case where the color-transformation operating portion 305c shown in FIG. 3 is configured by the circuits shown in FIGS. 6 and 7, since the color-transformation operating portion 305c can be arranged by the connection of simple nonlinear operation units, high-speed processing is possible, and the processing of a plurality of parallel outputs can be realized by a small-scale circuit configuration. In addition, as compared with a conventional matrix-type color transformation method, transformation accuracy improves remarkably in terms of the degree of freedom of parameters.

Further, as compared with the look-up table system, this configuration excels in that the circuit configuration is simple, and that the continuity and differentiable continuity are ensured in the input-output transformation.

In the above, a description has been given of the configuration of the apparatus in accordance with the present invention with reference to FIGS. 1–7. The apparatus of the present invention is comprised of the device-information storage means 22, the device-characteristic calculating means 25, the color-transformation-coefficient calculating means 20, and the operating means 24, and, in interlocking operation with the application software 42 and the device driver 43, performs 1) the calculation of the characteristics of the input and output devices, 2) the calculation of color transformation coefficients for image transformation between designated input and output devices, and 3) the operation of color transformation using a look-up table or differentiable continuous functions.

Figure 9:
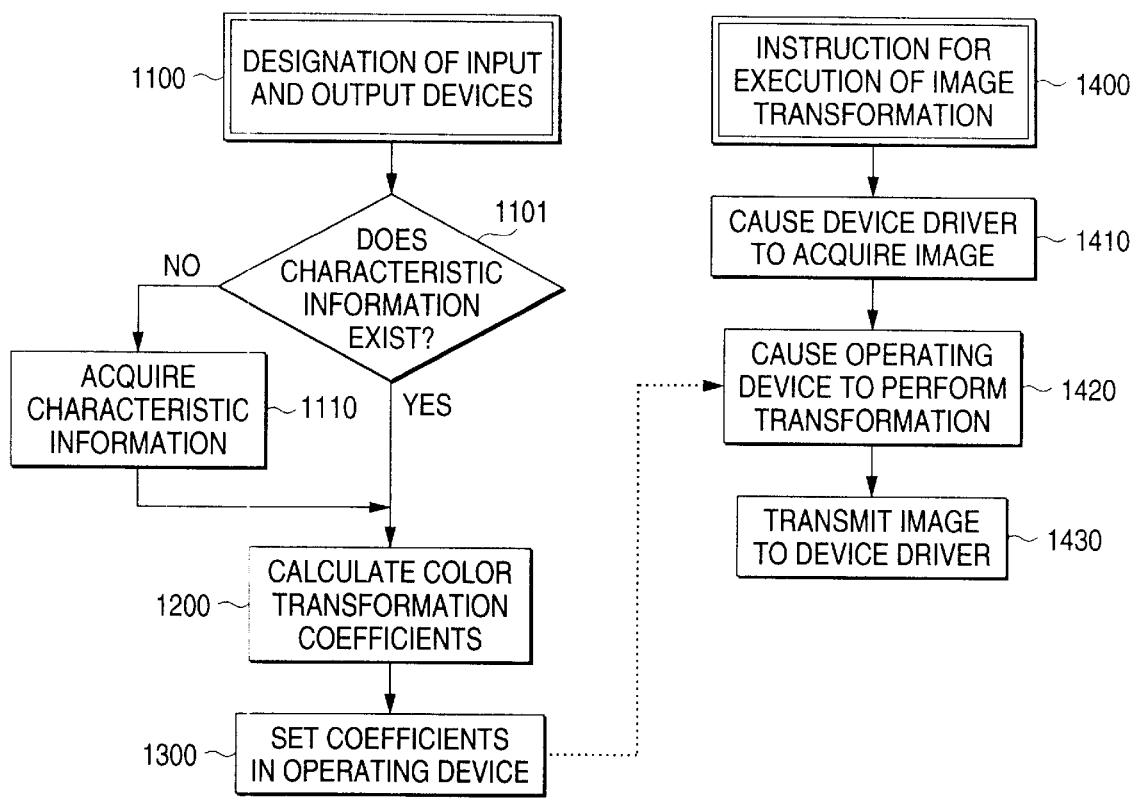
FIG. 9 illustrates the operation in accordance with the present invention.
Figure 10:
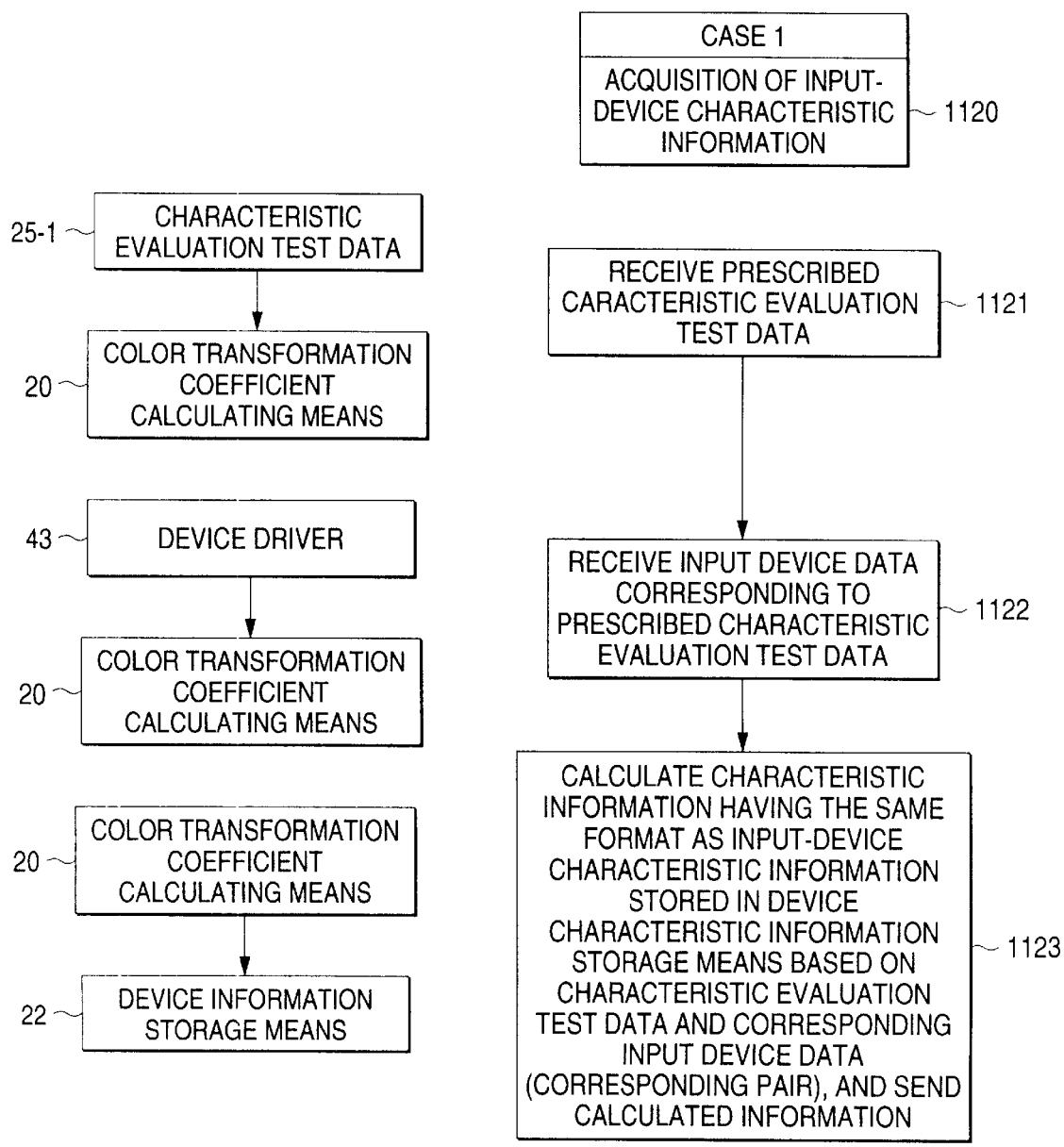
FIG. 10 illustrates the procedure of acquiring input-device-characteristic information.
Figure 11:
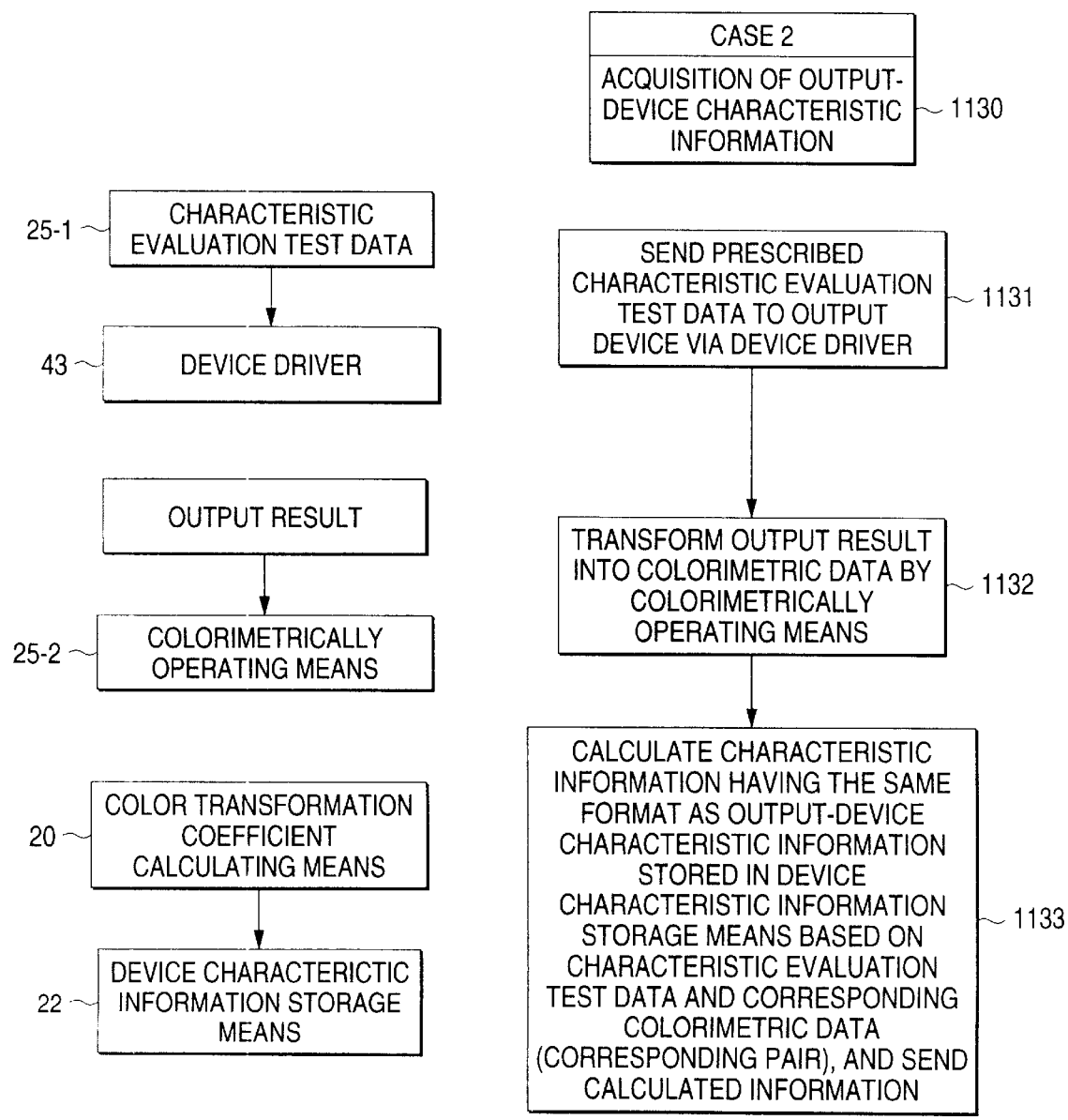
FIG. 11 illustrates the procedure of acquiring output-device-characteristic information.

As shown in FIG. 9, the operation of the apparatus of the present invention is largely classified into the flow for calculating the color transformation coefficients corresponding to the designations of input and output devices from the application software 42 or the device driver 43 and the flow for operating the color transformation using the coefficients. Generally, the device-characteristic information is given by discrete corresponding pairs of device-dependent data and device-independent data. In the aforementioned ICC profile, it is assumed that a look-up table is used for the operation of color transformation, and table lattice-point data are given. In a case where the profile given as the device-characteristic information and the designated color transformation are identical (in the case of transformation between the device-dependent data and device-independent data in terms of the form of color transformation in Table 1), and in a case where although the color-transformation-coefficient calculating means 20 is known, the designated color transformation differs (in the case of transformation between the device-dependent data and device-dependent data or transformation between device-independent data and device-independent data in terms of the form of color transformation in Table 1), it is necessary for the color-transformation-coefficient calculating means 20 to temporarily describe input-output relationships required for color transformation using differentiable continuous functions from a plurality of ICC profiles, and then to determine the look-up table lattice-point data required for the relevant color transformation by using those input-output relationships. Also, in a case where the device-characteristic information has not been prepared in advance, or the device characteristics must be calculated newly because of a need for updating, in the same way as described above, it is necessary to describe the input-output relationships required for color transformation using differentiable continuous functions, and then to determine the look-up table lattice-point data required for the relevant color transformation by using those input-output relationships. Since both processes are basically realized by the same flow, which is implemented in the case where the look-up table is used for the operation of color transformation, a description will be given later of the procedure (case (a)) in which 1) device characteristics are newly calculated, 2) input-output relationships required for color transformation by using differentiable continuous functions are described, and 3) the look-up table lattice-point data are determined.

Meanwhile, in the case where the operation of color transformation is carried out by differentiable continuous functions typified by a neural network, the weighting coefficients for the neural network are calculated by the color-transformation-coefficient calculating means 20 from discrete corresponding pairs such as the ICC profiles, and the operation of color transformation is performed on the basis of the coefficients. In this embodiment, the color-transformation-coefficient calculating means 20 is configured by a neural network, and the operating means 24 uses a neural network or the look-up table system. Accordingly, the flow which is implemented in the case where the color-transformation-coefficient calculating means 20 is configured by the neural network, and where the operating means 24 is the neural network (case(b)) is included in the aforementioned case (a). Accordingly, the classification of the aforementioned conceivable cases is shown only in the drawings in FIGS. 9–13, and a detailed description will be given of only the case (a) as a flow involving the most numerous steps.

Figure 12:
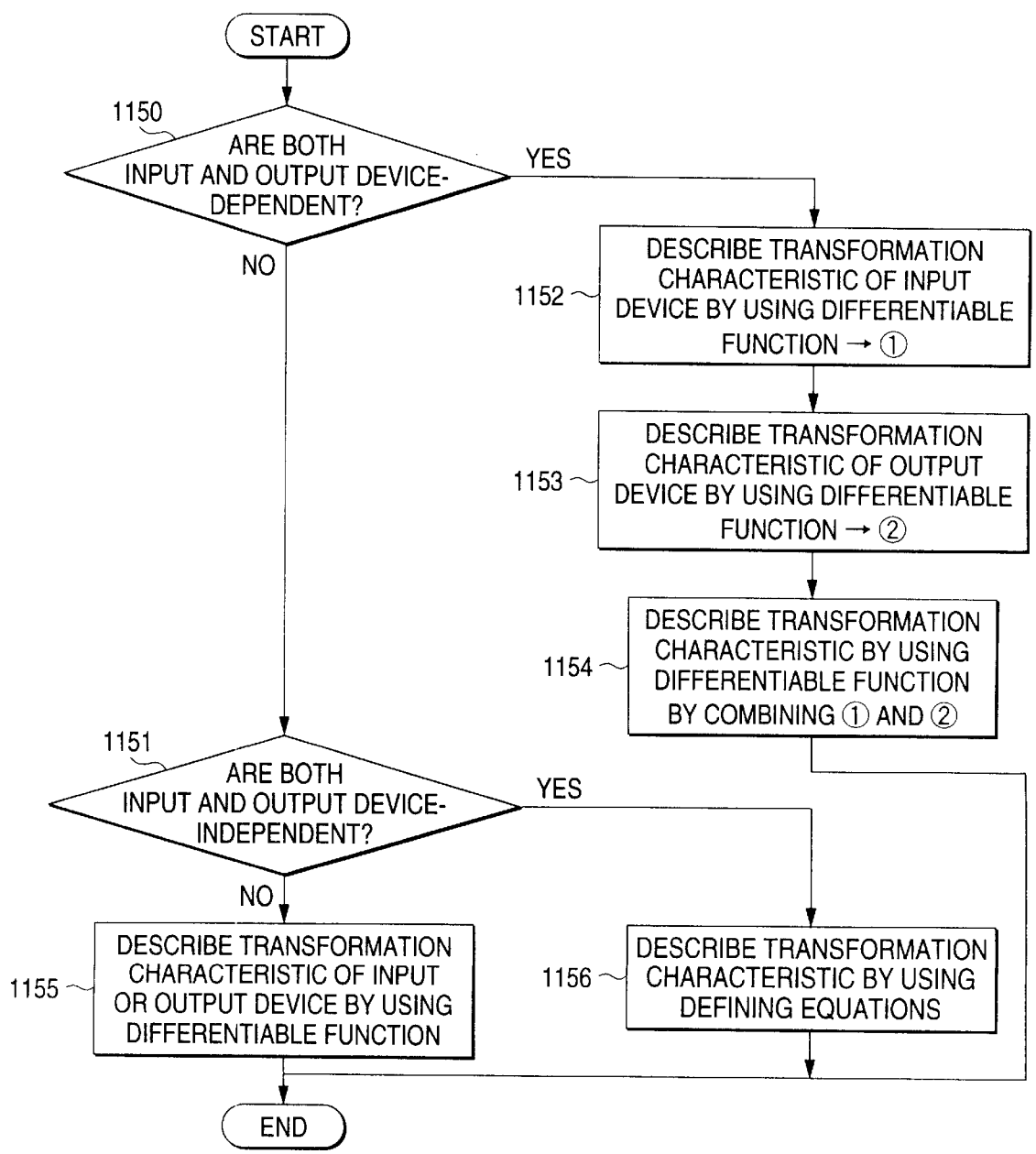
FIG. 12 illustrates the fact that processing differs depending on inputs and outputs.
Figure 13:
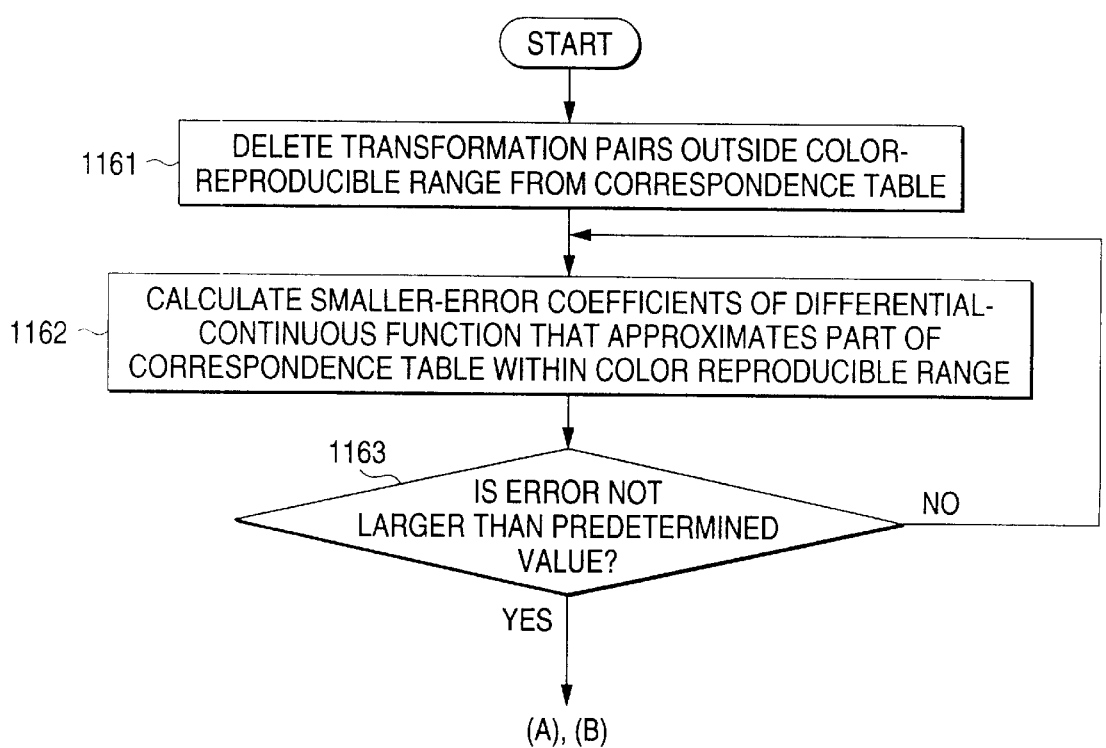
FIG. 13 illustrates the details of an example of approximation using a differentiable-continuous function.
Figure 14:
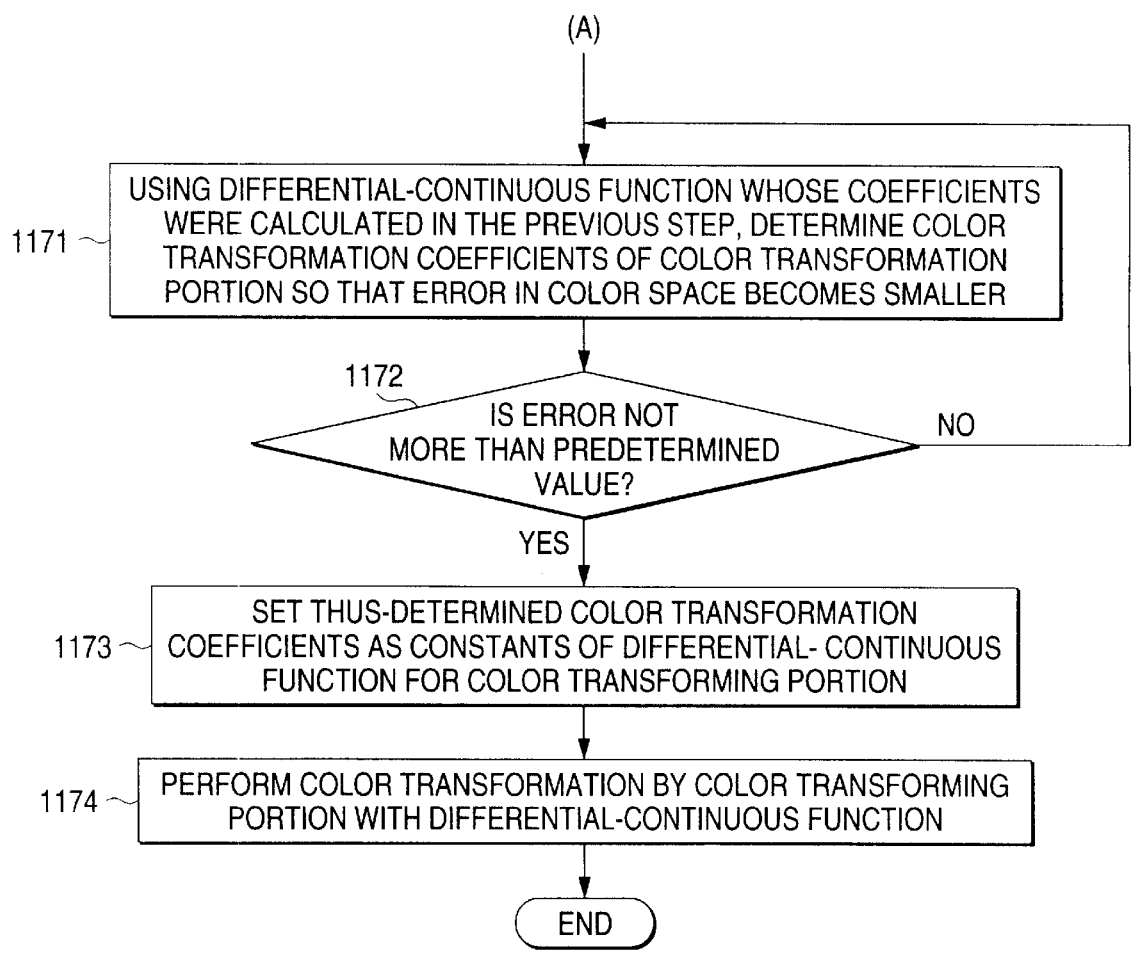
FIG. 14 illustrates the details of the calculation of function coefficients and color transformation in the case where a differentiable continuous function is used for the color transforming portion.
Figure 15:
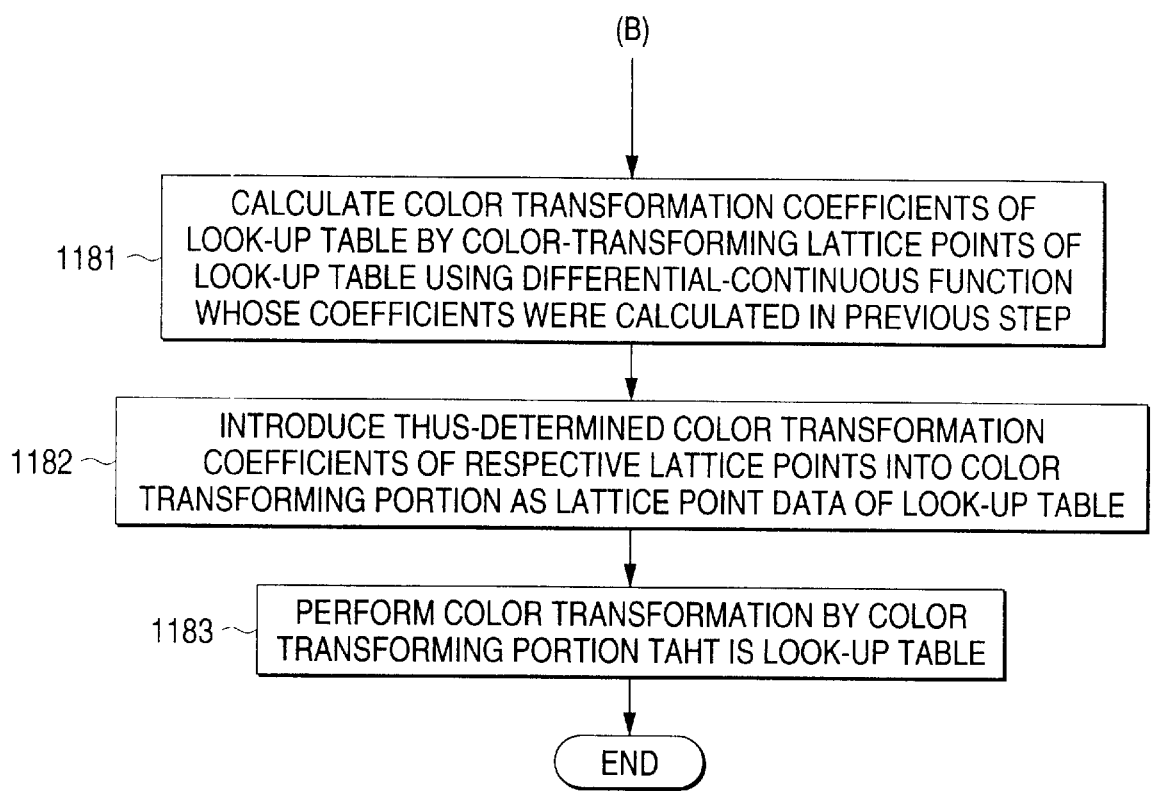
FIG. 15 illustrates the details of color transformation in a case where a look-up table is used for the color transforming portion.

FIG. 12 is a diagram illustrating that processing differs depending on input and output. FIG. 13 is a diagram illustrating the details of an example of approximation using a differentiable-continuous function. FIG. 14 is a diagram illustrating the details of the calculation of coefficients of a function and color transformation in the case where a differentiable continuous function is used for the color transforming portion. FIG. 15 is a diagram illustrating the details of color transformation in the case where a look-up table is used for the color transforming portion.

FIG. 12 shows the details of a process in which when color transformation coefficients are calculated by using a differentiable function, the calculation is made by classifying the case into the case where the input and output are device-dependent (Step 1150) or the case where they are device-independent (Step 1151). The classification in this case corresponds to the form of color transformation shown in Table 1. In the case where both input and output are device-dependent, the transformation characteristics of the input device are described (Step 1152), and the transformation characteristics of the output device are described (Step 1153). These functions are combined (Step 1154), and the color transformation characteristics from input to output are described by a composite function of the differentiable functions. Generally, a composite function of a differentiable function and a differentiable function is differentiable. If either one of the input and the output is device-dependent, its characteristic is described by a differentiable function (Step 1155). In the case where both the input and the output are device-independent, this relationship is generally given by a defining expression, so that the transformation characteristic is described in accordance with this defining expression (Step 1156).

In the steps for calculating the color transformation coefficients by the differentiable functions in FIG. 12 (Steps 1152 to 1155), the details of one example of the step of calculating the color transformation coefficients of each differentiable function are shown in FIG. 13. First, since the color reproduction characteristic generally does not have differentiable-continuity in the vicinity of a boundary of a color-reproducible range, transformation pairs falling outside the color-reproducible range are omitted, and only the transformation pairs falling within the color-reproducible range are extracted (Step 1161). Next, the smaller-error coefficients of a differentiable-continuous function, which approximates a table of correspondence falling within the color-reproducible range, is calculated from an appropriate initial value (Step 1162). Next, this error is evaluated (Step 1163), if the error is greater than a predetermined error, approximation is carried out again by using the coefficients calculated in the preceding Step 1162 as the initial values (Step 1162). This operation is repeated until the error becomes the predetermined value or less.

FIGS. 14 and 15 show the process in which after the color transformation coefficients are described through the operation shown in FIGS. 12 and 13, coefficients corresponding to the operating means for color transformation are calculated, and color transformation is carried out.

FIG. 14 shows the case in which the operating means uses a differentiable function. The color transformation coefficients for the color transforming portion are determined from appropriate initial values and the differentiable-continuous function used for calculating the coefficients in the preceding steps, such that the error in the color space becomes smaller (Step 1171). Approximation is carried out again by using as the initial values the coefficients calculated in the preceding Step 1171 (Step 1171) until the error becomes smaller than the predetermined value (Step 1172). These color transformation coefficients are set as constants of the differentiable-continuous function for the color transforming portion (Step 1173), and color transformation is carried out (Step 1174).

FIG. 15 is the case where the operating means uses a look-up table. The lattice point of the look-up table is subjected to color transformation by using the differentiable-continuous function used for calculating the coefficients in the previous step, and color transformation coefficients for the look-up table are calculated (Step 1181). These coefficients are introduced into the look-up table (Step 1182), and color transformation is carried out (Step 1183).

Figure 16:
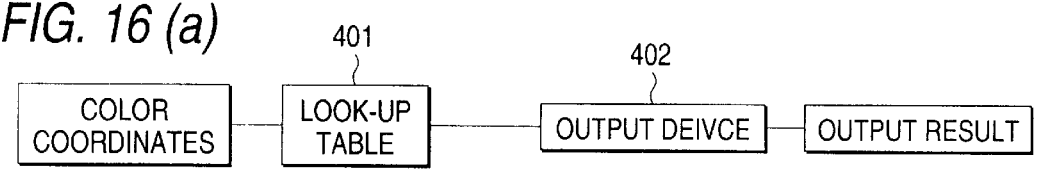
FIG. 16 illustrates an embodiment in which the contents of the look-up table are determined by using a neural network which has undergone learning in such a manner as to minimize the error in a colorant space.
Figure 16:
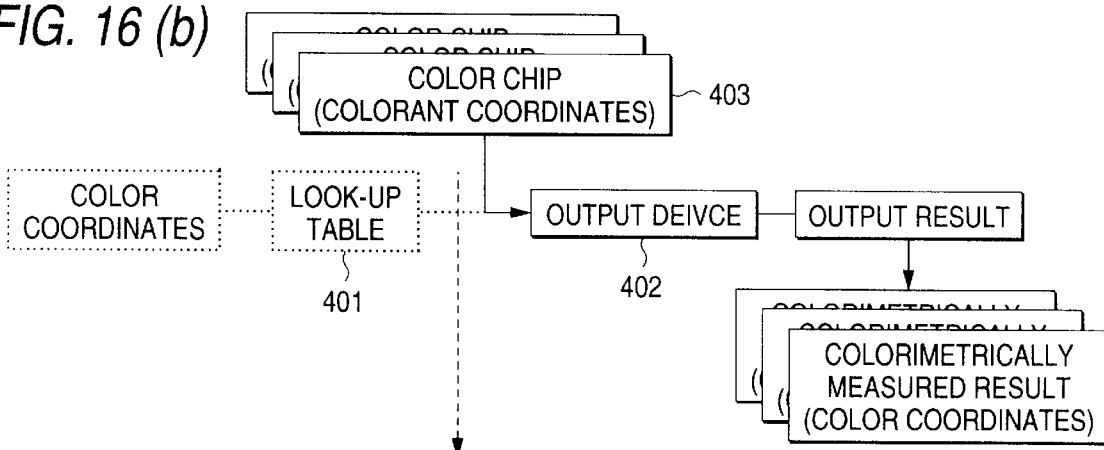
Figure 16:
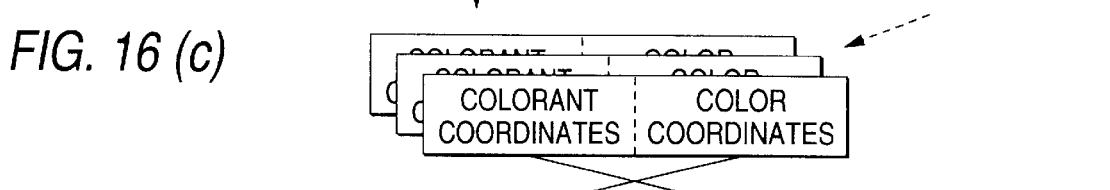
Figure 16:
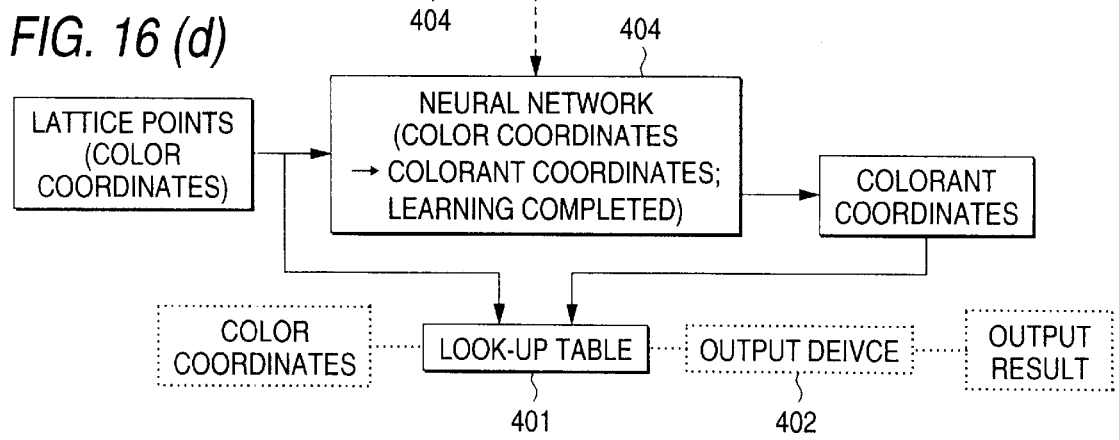

FIG. 16 is a diagram illustrating an example of the procedure in which, as the case (a), 1) device characteristics are newly calculated, 2) input-output relationships required for color transformation by using differentiable continuous functions are described, and 3) the look-up table lattice-point data are determined. FIGS. 16(*b*) to 16(*d*) show a case in which the color-transformation-coefficient calculating means 20 in accordance with the present invention is constituted by a neural network, and illustrates a method for determining lattice point data for the operating means 24 constituted by a look-up table.

First, as shown in FIG. 16(*b*), a multiplicity of combinations of color chips (colorant coordinates) 403 are prepared, and are printed on an output medium, such as paper, as color images by a particular color-image output device 402. These printed results are calorimetrically measured by device-independent color coordinates. In this manner, a multiplicity of pairs of output colorant coordinates of the color chips 403 and color coordinates which are calorimetrically measured results are prepared. As an example of the combination of output colorant coordinates, IT 8.7/3 proposed by the ANSI Board of Standards (ANSI/IT 8/SC 1/WG 11) is known.

Next, as shown in FIG. 16(*c*), by using the multiplicity of pairs of colorant coordinates of the color chips 403 prepared earlier and the device-independent color coordinates which are the calorimetrically measured results, back propagation learning is effected by consecutively supplying the color coordinates as inputs to a neural network 404 and input values (i.e., colorant coordinates) of the color-image output device 402 as teacher signals. By appropriately setting the scale of the neural network 404 and various constants for learning, the difference between the teacher signal and the output from the neural network 404 gradually decreases, and the measurement error is eliminated. When this difference has decreased sufficiently, learning is completed.

When the learning of the neural network 404 in FIG. 16(*c*) is completed, the data corresponding to lattice points are given to the neural network, and outputted values of the colorant coordinates are generated as predetermined coefficients for the look-up table. If input coordinates of lattice points required for the look-up table are inputted to the neural network 404 which has undergone learning, it is possible to estimate corresponding colorant coordinates. As shown in FIG. 16(*d*), these estimated values can be registered in the device-information storage means 22 as device-characteristic information for the look-up table 1 which is the operating means 24. Meanwhile, if the scale of the neural network 404 is made large, there is a tendency that the accuracy improves. Accordingly, if the scale of the neural network 404 is made sufficiently large, it is possible to improve the accuracy of the device-characteristic information.

Through the above-described method, it is possible to obtain results in which the error in the colorant space is small. Generally, if the error in the colorant space is 0, the apparent difference in the output results disappears. Generally, however, the apparent difference in the output results is not minimal. Here, in the present invention, by using a uniform color space in which the apparent difference and the Euclidean distance in the color space are generally proportional, the neural network is configured in such a manner as to further reduce the error in this color space.

Figure 17:
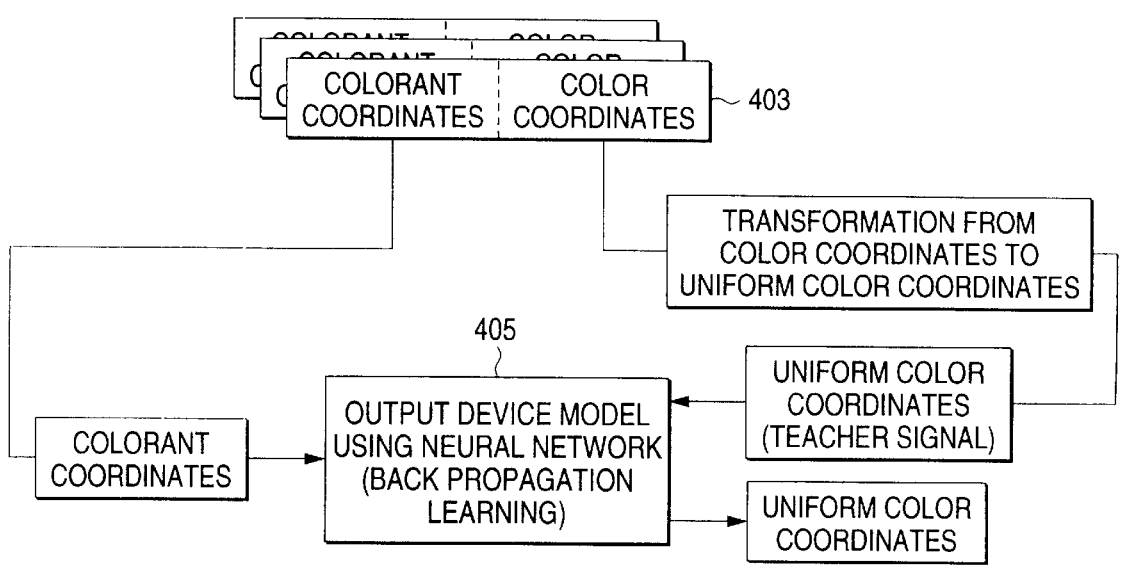
FIG. 17 illustrates an embodiment in which the contents of the look-up table are determined by using the neural network which has undergone learning, in such a manner as to minimize the error in a uniform color space.
Figure 17:
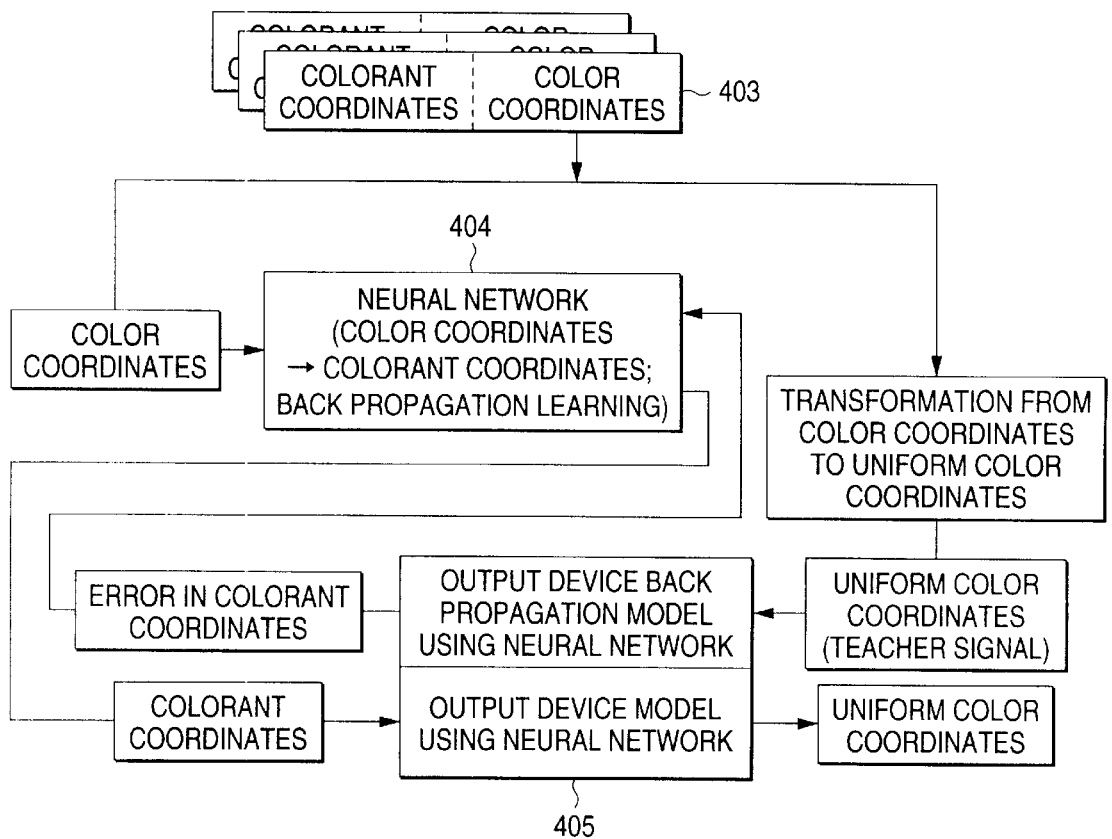
Figure 17:
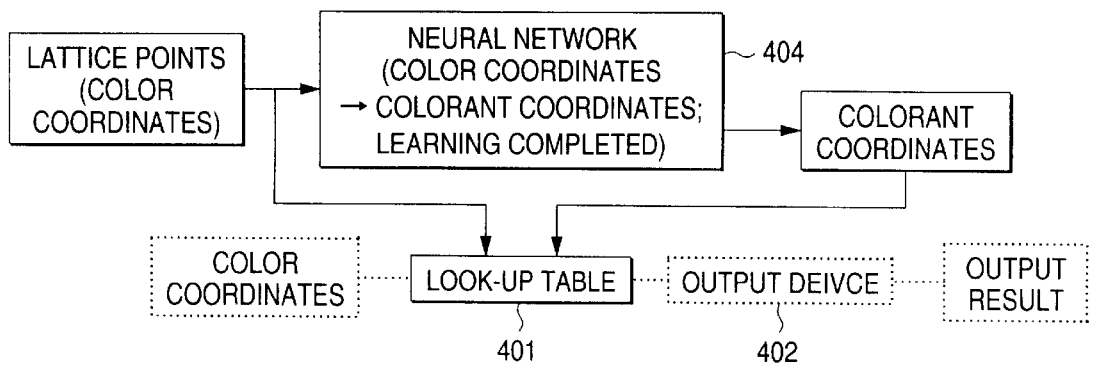

FIG. 17 is a diagram illustrating an embodiment in which the coefficients of the look-up table are determined by using the neural network which has undergone learning in such a manner as to minimize the error in the uniform color space. In the present invention, to determine the error in the colorant space, differentiable functions for an output device are prepared, and the neural network is made to undergo learning by using the functions. The reason for using the differentiable functions in the present invention is as follows.

Even if the error is large in colorant coordinates, there are cases where the apparent difference in color (visually sensed by a human being) is small. For instance, in a case where yellow is superposed on 100% black print, even if yellow is 0%, there is practically no difference in the apparent color. On the other hand, there are cases where even if the apparent difference in color is large, the colorant coordinates are small. The purpose of improving the accuracy of a color change is to minimize the apparent difference in color. Accordingly, it can be understood that it is desirable to temporarily transform the error in the colorant coordinates into that in a uniform color space, and to effect evaluation by using the error in this space. If the error after learning becomes completely 0, there would be no difference according to any evaluation method. However, since the actual size of the neural network is not infinite, the error remains even if learning is completed.

In the color transformation network for effecting transformation from color coordinates into colorant coordinates, learning is carried out in such a manner as to reduce the difference in outputs, i.e., the colorant coordinates. In contrast, in the present invention, the colorant coordinates are transformed into a uniform color space by using differentiable functions of the output device, so as to minimize the color difference. In the back propagation in that case, it is necessary to calculate the difference (in $\delta/\delta$ respective outputs). Here, the respective outputs are device-dependent signals such as Y, M, C, and K or R, G, and B, and the difference is the color difference E in the device-independent uniform color space. Accordingly, the output device functions need to be partially differentiable with respect to the outputs of Y, M, C, and K or R, G, and B, so that ($\delta E/\delta Y$), (δE/δM), (δE/δC) and (δE/δK), or (δE/δR), (δE/δG) and (δE/δB) are determined.

The fact that the functions of the output device are differentiable means that the functions are partially differentiable with respect to the respective device-dependent signals, i.e., Y, M, C, and K. In addition, the learning of the color transformation neural network is effected by using these values. In the description that follows, since a differentiable model of an output device also uses a neural network, the model and the neural network will be described as an output device model and a color transformation neural network to differentiate them. Incidentally, if the output device model is capable of differentiating the error, it need not necessarily be a neural network.

First, if the color coordinates of actually measured values are not coordinates of the uniform color space, the coordinates are transformed prior to learning. For example, in a case where the input color coordinates are NTSC standard RGB signals, the input color coordinates are transformed into, for instance, CIE L*a*b* coordinates of a uniform color space. The transformation between the two color coordinates can be effected by a simple calculation. Incidentally, if the input color coordinates are those of a uniform color space, it is not necessary to effect this transformation. Next, as shown in FIG. 17(a), an output device model 405 is learned through back propagation learning on the basis of the actually measured values. As the scale of the neural network and various constants for learning are appropriately set, the difference between the teacher signal and the output from the neural network gradually decreases. Learning is completed when this difference has decreased sufficiently.

Since the color coordinates of the output device model 405 are uniform color coordinates, the difference in output is generally proportionate to the difference in perception, and if the error is sufficiently small, the difference in perception virtually disappears. Here, since the measurement error is not learned due to the characteristic of the neural network, as described earlier, it is possible to configure the output device model 405 having a small error. It should be noted that the output device model 405 can be configured by polynomials or other differentiable functions as well.

Next, as shown in FIG. 17(b), the color transformation neural network for transforming the color coordinates into colorant coordinates is configured by using the output device model 405 thus formed. When appropriate color coordinates, e.g., a point in the NTSC standard RGB color space:

(Input) $R_i$, $G_i$, $G_i$ is learned, an estimated output:

(Output) $C_i$, $M_i$, $Y_j$ is temporarily obtained by using the color transformation neural network. An output is estimated by using the output device model, and estimated values:

(Estimate) $L_i'$, $a_i'$, $b_i'$ are obtained in the uniform color space. The input is transformed into the same uniform color space as the estimate, and when its results are set as:

(Input) $L_i''$, $a_i''$, $b_i''$ the error in the output of the color transformation neural network is set as:

(Error) $d(L_i', a_i', b_i'; L_i'', a_i'', b_i'')$ where d is the distance in that color space, and in the CIE L*a*b* space, for example, it is based on the Euclidean distance:

$$\Delta E_i = \{(L_i'-L_i'')^2 + (a_i'-a_i'')^2 + (b_i'-b_i'')^2\}^{1/2}$$

This difference $\Delta E_i$ is transformed in the colorant space by using the output device model. Since the output device model 405 is differentiable, the following are determined with respect to the inputs of the output device model:

$\delta E_i/\delta R_i$
$\delta E_i/\delta G_i$
$\delta E_i/\delta B_i$

The respective constants of the color transformation neural network are learned through the usual back propagation method in such a manner that this difference $\Delta E_i$ decreases.

As the scale of the neural network and the various constants for learning are appropriately set, the difference $\Delta E_i$ gradually decreases, and the measurement error is eliminated. Learning is completed when this difference has decreased sufficiently. In this process, the difference between each of the actually measured values of R, G, and B and the output from the color transformation neural network does not necessarily decrease, but the error decreases in the uniform color space.

Finally, as shown in FIG. 17(c), as the lattice points of the look-up table are imparted to the inputs to the color transformation neural network obtained in this method, it is possible to form the lattice point data of the look-up table.

Four or more colorants, such as yellow (Y), magenta (M), cyan (C), and black (K), are generally used in printers. In this case, the coordinates of the three colors of Y, M, and C are temporarily determined, and a black component obtained by mixing Y, M, and C is substituted by K by an appropriate amount so as to obtain colorant coordinates from the color coordinates. In accordance with the method of the present invention as well, if the coordinates of the three colors of Y, M, and C are temporarily determined, and a black component obtained by mixing Y, M, and C is substituted by K by an appropriate amount, colorant coordinates can be obtained from the color coordinates and can be set as the lattice point data of the look-up table.

However, since the colorant coordinates of four or more colorants, such as Y, M, C, and K, cannot be determined uniformly from the color coordinates, the colorant coordinates of the four colors cannot be obtained directly by applying the method of the present invention. Accordingly, if one color among Y, M, C, and K, e.g., K, is used as an input to the color transformation neural network in addition to the input color coordinates, the outputs from the color transformation neural network can be determined uniformly.

Figure 18:
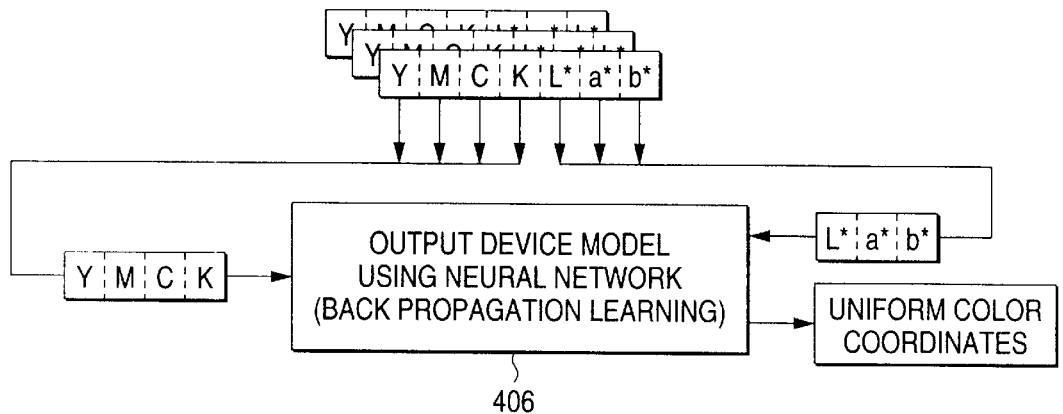
FIG. 18 illustrates the process of reproducing four colors so as to determine the contents of the look-up table by a method in which the error in the uniform color space is minimized, and an appropriate black can be made selectable.
Figure 18:
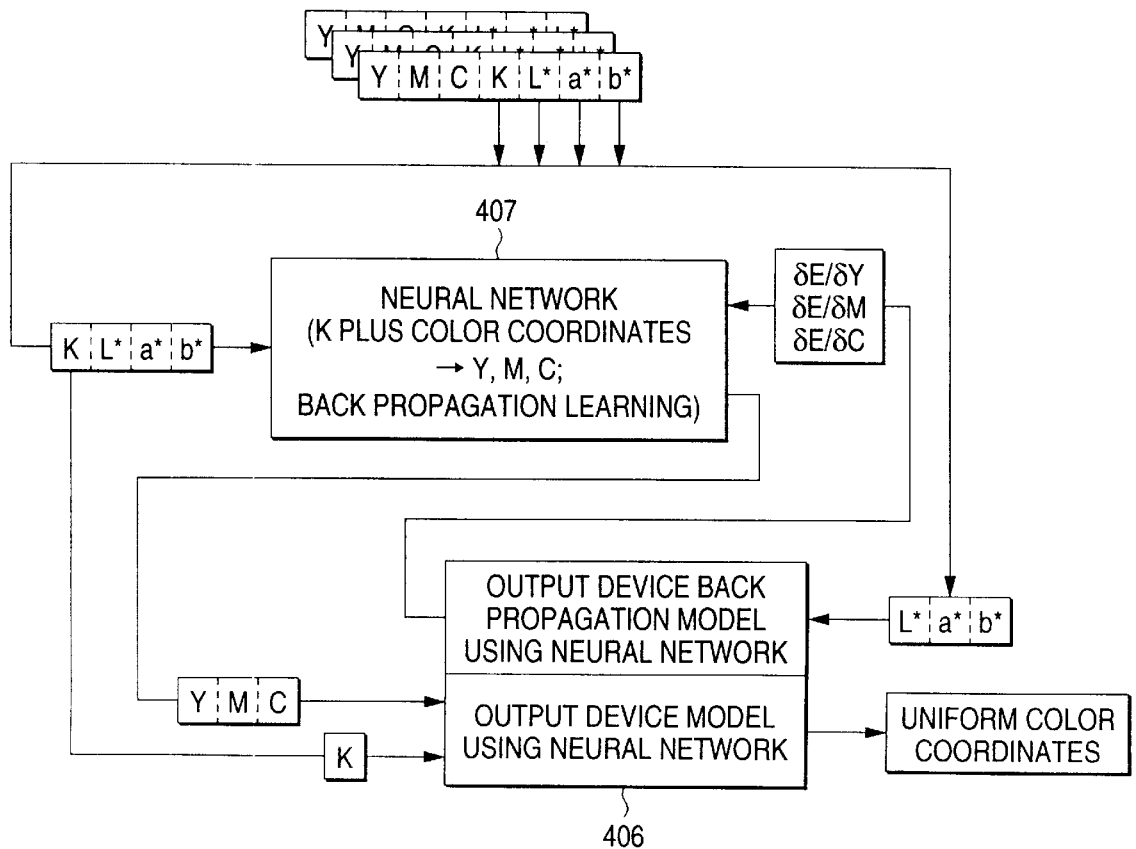
Figure 19:
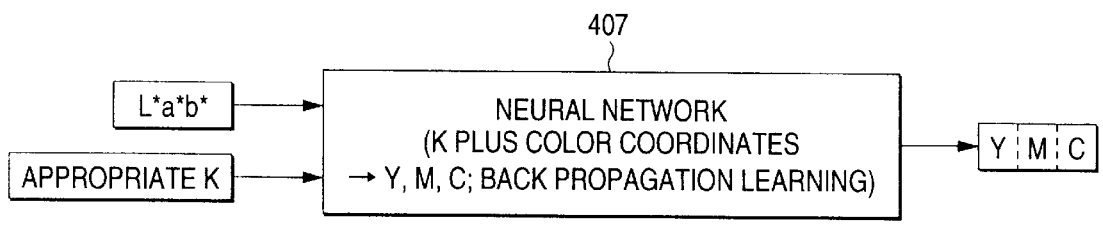
FIG. 19 illustrates a process continuing from FIG. 18.
Figure 19:
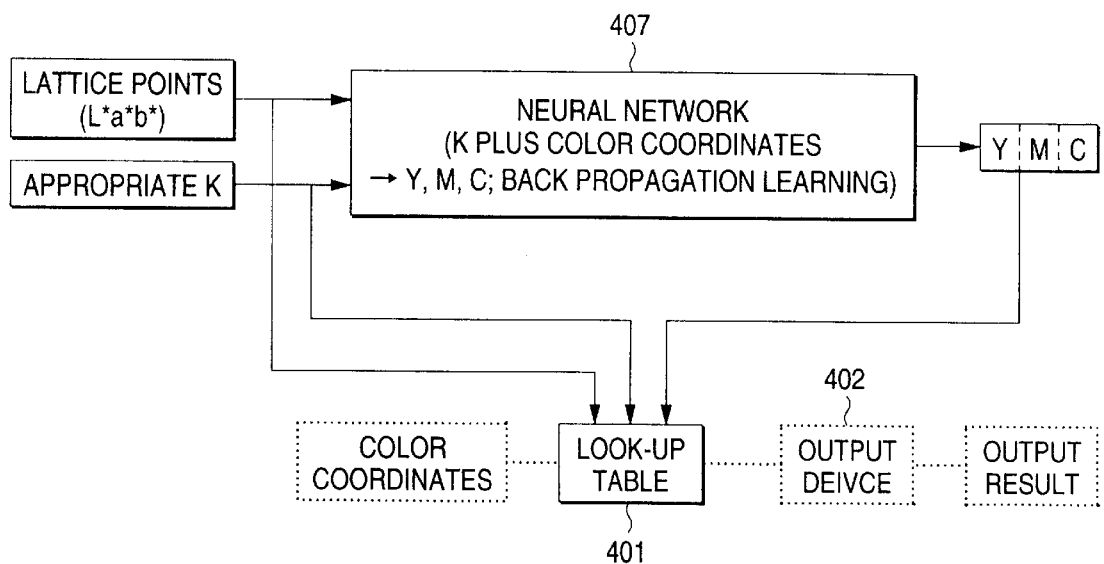

FIGS. 18 and 19 are diagrams illustrating an embodiment for determining coefficients for reproducing four colors wherein the coefficients of the look-up table are determined by a method in which the error in the uniform color space is minimized, and an appropriate K is made selectable. As shown in FIG. 18(b), a four-input, three-output color transformation neural network is configured by inputting to a color transformation network 407 color coordinates and one of colorant coordinates and the error of an output device model as the error signal. At this juncture, an output from the color transformation network 407 and one of the colorant coordinates inputted to the color transformation network 407 are inputted to an output device model 406.

As shown in FIG. 18(a), as the inputs to the color transformation neural network 407, if color coordinates and one of other colorant coordinates are inputted to the color transformation neural network 407, it is possible to obtain the other three colorant coordinates. Although one of the colorant coordinates used as an input may be determined appropriately, in a printer, if one of the colorant coordinates is assumed to be K, a minimum value of K is 0%, and a maximum value of K is obtained when minimum values of Y, M, and C are 0%. The maximum value of K can be determined by binary search or the like. By using these values, it is possible to determine the lattice point data of the look-up table, as shown in FIG. 19(*b*).

Figure 20:
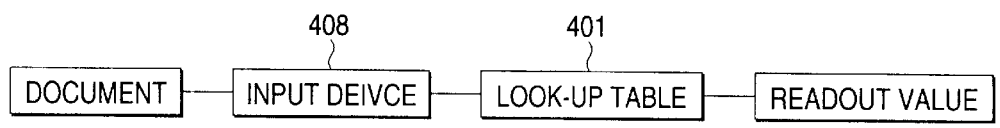
FIG. 20 illustrates an embodiment in which the contents of the look-up table are determined in such a manner as to minimize the error in a uniform color space.
Figure 20:
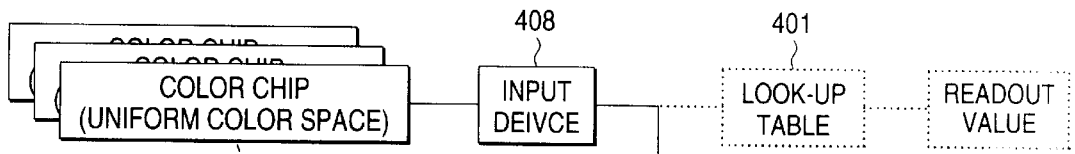
Figure 20:
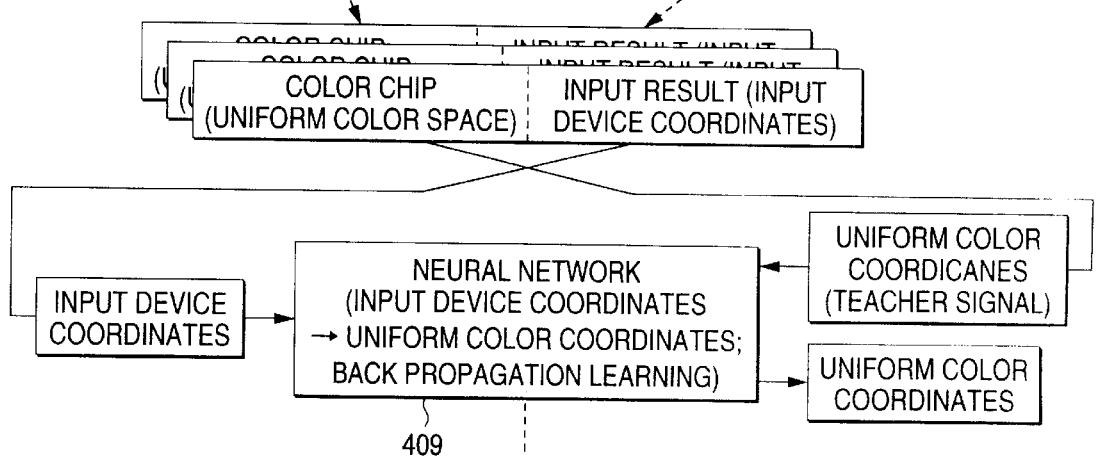
Figure 20:
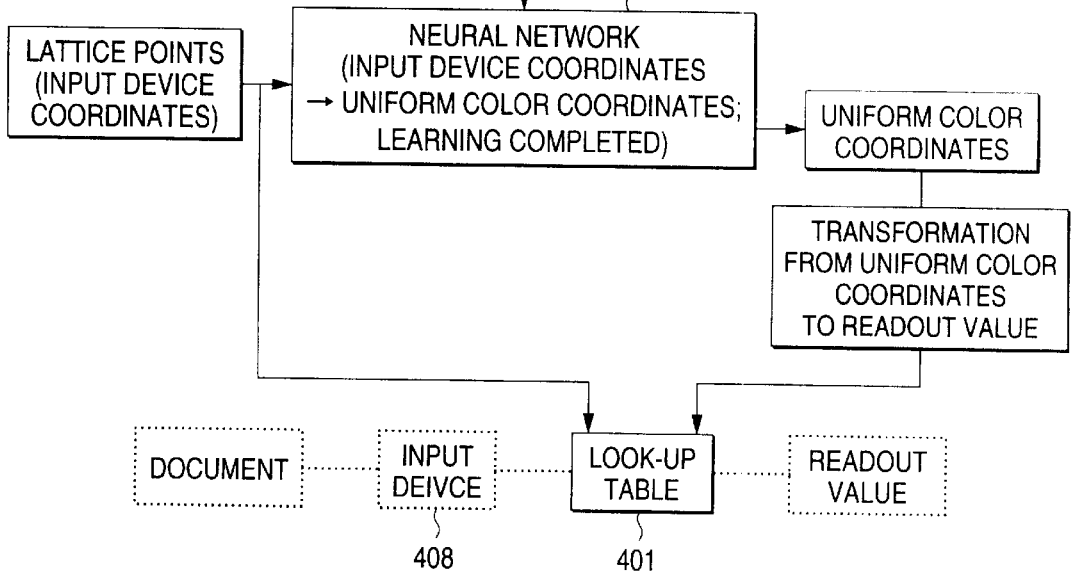

FIG. 20 is an embodiment in which the coefficients for the look-up table of an input device are determined as an example of acquiring other input-output information. As shown in FIG. 20(*a*), a case is considered in which a document is inputted, and input results, e.g., green (G), blue (B), and red (R) signals, are transformed by using the color transformation operation of a look-up table 401 to obtain read values, e.g., XYZ tristimulus values. In this case as well, as compared with a case in which the error is reduced in terms of read values, the reduction of the error in the uniform color space makes it possible to obtain results which visually give a smaller error, as described before.

First, as shown in FIG. 20(*b*), color chips whose color coordinates in the uniform color space are known are inputted to the input device 408. As one example of such color chips, color chips (ISO IT 8/7.1, 2) are known. A table of correspondence is prepared on the basis of the results obtained from this process. Next, as shown in FIG. 20(*c*), this table of correspondence is given to a neural network 409, which is made to undergo learning in such a manner as to reduce the error in the uniform color space. As shown in FIG. 20(*d*), by using the learned results, a lattice point are inputted, and the resultant uniform color coordinates are transformed into read values, thereby obtaining the lattice point data of the look-up table 401. At this juncture, if the color coordinates of the read value are equal to the uniform color space of the color chip, the transformation may be omitted.

As described above, in accordance with the present invention, with respect to color transformation between various device-dependent and device-independent signals between a plurality of color devices on a network, it is possible to provide in a unified manner various functions including 1) the calculation of characteristics of input-output devices, 2) the calculation of color transformation coefficients for image transformation between designated input and output devices, and 3) the operation of color transformation using a look-up table or differentiable-continuous functions.

Since these functions are provided to application software and a device driver, the apparatus in accordance with the present invention can be utilized in the environment of preparing and editing wide-ranging color documents. For example, in the printing industry, which is a typical example of high-end DTP, a reproduction of the same color as that of a final print can be presented prior to final printing by using a simple printer, thereby making it possible to allow an orderer of the print and a document designer to form a unified view at an early period. In addition, since the method of calculating the characteristics of input-output devices is provided at the same time, it is possible to overcome the trouble due to the fact that the same color reproduction cannot be obtained because of differences between individual devices and changes over time.

What is claimed is:

1. A color transforming method for transforming a first color signal to a second color signal based on predetermined transformation information of discrete points, comprising:

determining a first differentiable function via a neural network based on said transformation information and said second color signal;

generating color transforming coefficients of a look-up table or a second differentiable function based on said transformation information and said first differentiable function, thereby reducing interpolation errors, so that an error in a color space decreases; and transforming the first color signal to the second color signal by the look-up table or the second differentiable function.

2. The method according to claim 1, wherein the transformation information is lattice point data of a look-up table.

3. The method according to claim 1, wherein the transformation information is plural sets of lattice point data of a look-up table.

4. The method according to claim 1, wherein the transformation information consists of lattice point data of a look-up table and information indicating whether color reproduction with respect to the lattice point data is possible.

5. A color transforming apparatus comprising:

means comprising a differentiable function, implemented by a hierarchical neural network, for calculating transformation coefficients, thereby reducing interpolation errors, based on transformation information of discrete points that is given in advance; and means comprising a look-up table, for transforming a first color signal into a second color signal using the calculated transformation coefficients.

6. A color transforming apparatus comprising:

means comprising a differentiable function, implemented by a hierarchical neural network, for calculating transformation coefficients, thereby reducing interpolation errors, based on transformation information of discrete points that is given in advance; and means comprising a differentiable function, implemented by the hierarchical neural network, for transforming a first color signal into a second color signal using the calculated transformation coefficients.

7. The apparatus according to claim 5 or 6, wherein the transformation information is lattice point data of a look-up table.

8. The apparatus according to claim 5 or 6, wherein the transformation information is plural sets of lattice point data of a look-up table.

9. The apparatus according to claim 5 or 6, wherein the transformation information consists of lattice point data of a look-up table and information indicating whether color reproduction with respect to the lattice point data is possible.

10. A method of determining lattice point data of a look-up table for transforming input color coordinates into colorant coordinates of a color image output device, wherein:

the lattice point data of the look-up table are determined by a neural network, thereby reducing interpolation errors, that has learned input color coordinates of the color image output device and actually measured colorant coordinate values corresponding thereto.

11. A method of determining lattice point data of a look-up table for transforming input color coordinates into colorant coordinates of a color image output device, comprising the steps of:

causing the color image output device to output an appropriate color chip;

generating an input/output correspondence table of the color image output device by calorimetrically measuring the color chip in the same color coordinate system as an input color coordinate system;

transforming input color coordinates into uniform color coordinates, if the input color coordinates are not in a uniform color space;

constructing an output device model, by using a differentiable function, thereby reducing interpolation errors for estimating uniform color coordinates from colorant coordinates of the color image output device, based on the input/output correspondence table;

causing a neural network as a reverse correspondence to the output device model to undergo back propagation learning so that a distance in a uniform color space is reduced; and determining lattice point data of the look-up table by using the neural network.

12. The method according to claim 11, wherein the output device model is constituted of a neural network, and is constructed by back propagation learning.

13. A method of determining lattice point data of a look-up table for effecting color transformation of an image input device, comprising the steps of:

inputting a color chip to the color input device, color coordinates in a uniform color space of the color chip being known;

generating a correspondence table between the color coordinates of the color chip and input values;

causing a neural network to learn the color coordinates of the color chip from the input values by a back propagation method based on the correspondence table; and determining lattice point data of the look-up table by inputting lattice points of the look-up table to the neural network, thereby reducing interpolation errors, and transforming output values of the neural network into coordinates in an appropriate color space.

14. A method of determining lattice point data of a look-up table used in a color image output device in which color coordinates are transformed into colorant coordinates by the look-up table and which is driven based on the colorant coordinates, comprising the steps of:

preparing a multiplicity of pairs of colorant coordinates and color coordinates obtained by colorimetrically measuring output results of the color image output device corresponding to the colorant coordinates;

causing a neural network to undergo learning by using the colorant coordinates as a teacher signal and the color coordinates as an input signal; and storing in the look-up table colorant coordinates that are obtained as an output of the neural network when color coordinates of lattice points of the look-up table are input to the neural network thereby reducing interpolation errors which has undergone the learning.

15. An apparatus for determining lattice point data of a look-up table used in a color output device in which color coordinates are transformed into colorant coordinates by the look-up table and which is driven based on the colorant coordinates, comprising:

a neural network for learning by using particular colorant coordinates as a teacher signal and using as an input signal color coordinates that are obtained by colorimetrically measuring output results of the color image output device corresponding to the particular colorant coordinates; and means for storing in the look-up table colorant coordinates that are obtained as an output of the neural network thereby reducing interpolation errors when color coordinates of lattice points of the look-up table are input to the neural network which has undergone the learning.

16. The method of claim 1, where the color space includes a uniform color space.

* * * * *

UNITED STATES PATENT AND TRADEMARK OFFICE
CERTIFICATE OF CORRECTION

PATENT NO. : 5,978,107
DATED : November 2, 1999
INVENTOR(S) : MURAI et al.

It is certified that error appears in the above-identified patent and that said Letters Patent is hereby corrected as shown below:

Claim 11, column 22, line 67, "calorimetrically" should read --colorimetrically--.
Claim 11, column 23, line 7, after "errors", insert --,--.
Claim 14, column 24, line 15, after "network", insert --,--.
Claim 14, column 24, line 16, after "errors", insert --,--.
Claim 15, column 24, lines 25-26, "calorimetrically" should read --colorimetrically--.
Claim 15, column 24, line 31, after "network", insert --,--; and after "errors", insert --,--.

Signed and Sealed this

Thirty-first Day of October, 2000

Attest:

Attesting Officer

Q. TODD DICKINSON
Director of Patents and Trademarks